(12) United States Patent
Tronnes et al.

(10) Patent No.: US 12,239,930 B2
(45) Date of Patent: Mar. 4, 2025

(54) FILTER MEDIA WITH IMPROVED DUST LOADING

(71) Applicant: Donaldson Company, Inc., Minneapolis, MN (US)

(72) Inventors: Gregory S. Tronnes, Bloomington, MN (US); Robert M. Rogers, Minnetonka, MN (US); Aflal Rahmathullah, Savage, MN (US)

(73) Assignee: Donaldson Company, Inc., Bloomington, MN (US)

( * ) Notice: Subject to any disclaimer, the term of this patent is extended or adjusted under 35 U.S.C. 154(b) by 529 days.

(21) Appl. No.: 17/598,585

(22) PCT Filed: Mar. 27, 2020

(86) PCT No.: PCT/US2020/025467
§ 371 (c)(1),
(2) Date: Sep. 27, 2021

(87) PCT Pub. No.: WO2020/198681
PCT Pub. Date: Oct. 1, 2020

(65) Prior Publication Data
US 2022/0152537 A1   May 19, 2022

Related U.S. Application Data

(60) Provisional application No. 62/825,188, filed on Mar. 28, 2019.

(51) Int. Cl.
*B01D 53/02* (2006.01)
*B01D 39/16* (2006.01)
*B01D 39/18* (2006.01)

(52) U.S. Cl.
CPC ......... *B01D 39/1623* (2013.01); *B01D 39/18* (2013.01); *B01D 2239/0654* (2013.01); *B01D 2239/069* (2013.01); *B01D 2239/1233* (2013.01)

(58) Field of Classification Search
CPC ...... B01D 2239/0654; B01D 2239/069; B01D 2239/1233; B01D 39/1623; B01D 39/18
See application file for complete search history.

(56) References Cited

U.S. PATENT DOCUMENTS 4,576,853 A    3/1986  Vaughn et al.
4,701,197 A   10/1987  Thornton et al.
(Continued)

FOREIGN PATENT DOCUMENTS

CN    101668576 A    3/2010
CN    103505942 A    1/2014
(Continued)

OTHER PUBLICATIONS

International Application No. PCT/US2021/052198 filed Sep. 27, 2021, PCT International Search Report and Written Opinion mailed Mar. 4, 2022, 17 pages.
(Continued)

*Primary Examiner* — Christopher P Jones
(74) *Attorney, Agent, or Firm* — Mueting Raasch Group

(57) ABSTRACT

Embodiments disclosed herein relate to filter media having a downstream layer of filter material and an upstream layer of fibers. The downstream layer of filter material has a capture efficiency of at least 10% and the upstream layer of fibers has a mean fiber diameter of at least 10 microns and a solidity of less than 10%. A spacing structure defines a mean void distance between the upstream layer of fibers and the downstream layer of filter material.

20 Claims, 13 Drawing Sheets

(56) References Cited

U.S. PATENT DOCUMENTS

| | | | |
|---|---|---|---|
| 4,702,940 A | 10/1987 | Nakayama et al. | |
| 5,554,287 A | 9/1996 | Beck et al. | |
| 5,683,794 A | 11/1997 | Wadsworth et al. | |
| 5,721,180 A | 2/1998 | Pike et al. | |
| 5,785,725 A | 7/1998 | Cusick et al. | |
| 5,800,586 A | 9/1998 | Cusick et al. | |
| 6,528,439 B1 | 3/2003 | Stokes et al. | |
| 6,716,274 B2 | 4/2004 | Gogins et al. | |
| 6,762,138 B2 | 7/2004 | Ferreira et al. | |
| 6,994,742 B2 | 2/2006 | Barris et al. | |
| 7,008,465 B2 | 3/2006 | Graham et al. | |
| 7,501,003 B2 | 3/2009 | Muller et al. | |
| 7,556,663 B2 | 7/2009 | Niakan | |
| 7,641,055 B2 | 1/2010 | Ferrer et al. | |
| 7,645,329 B2 | 1/2010 | Niakan et al. | |
| 9,056,268 B2 | 6/2015 | Jones et al. | |
| 9,446,340 B2 | 9/2016 | Babcock et al. | |
| 9,474,994 B2 | 10/2016 | Gao et al. | |
| 2003/0010002 A1* | 1/2003 | Johnson | B01D 39/1623 55/486 |
| 2003/0150199 A1 | 8/2003 | Tanaka et al. | |
| 2007/0175192 A1 | 8/2007 | Niakan et al. | |
| 2008/0017038 A1 | 1/2008 | Wu | |
| 2008/0148699 A1 | 6/2008 | Sazawa et al. | |
| 2008/0202078 A1 | 8/2008 | Healey et al. | |
| 2008/0276805 A1* | 11/2008 | Lotgerink-Bruinenberg | B60H 3/0658 96/75 |
| 2009/0272084 A1* | 11/2009 | Healey | B01D 46/522 55/487 |
| 2010/0006498 A1 | 1/2010 | Duello et al. | |
| 2010/0065236 A1 | 3/2010 | Henriksson et al. | |
| 2010/0107881 A1* | 5/2010 | Healey | B01D 39/1623 55/486 |
| 2013/0001155 A1 | 1/2013 | Neubauer et al. | |
| 2013/0341290 A1* | 12/2013 | Yu | B01D 39/18 210/504 |
| 2014/0326661 A1 | 11/2014 | Madsen et al. | |
| 2015/0290561 A1 | 10/2015 | Barsness et al. | |
| 2015/0375150 A1* | 12/2015 | Sahbaee | B01D 46/546 55/482 |
| 2016/0023146 A1 | 1/2016 | Hampton et al. | |
| 2016/0038865 A1 | 2/2016 | Jones et al. | |
| 2016/0051918 A1 | 2/2016 | Walz et al. | |
| 2016/0059167 A1 | 3/2016 | Nagy et al. | |
| 2016/0136553 A1 | 5/2016 | Healey et al. | |
| 2016/0279550 A1 | 9/2016 | Agrahari et al. | |
| 2017/0232371 A1 | 8/2017 | Anantharamaiah et al. | |
| 2017/0312673 A1 | 11/2017 | Smith et al. | |
| 2017/0319993 A1 | 11/2017 | Chung et al. | |
| 2018/0021716 A1 | 1/2018 | Li et al. | |
| 2018/0272258 A1 | 9/2018 | Healey et al. | |
| 2019/0054412 A1 | 2/2019 | Rocklitz | |
| 2020/0368654 A1* | 11/2020 | Higginson | B32B 5/08 |

FOREIGN PATENT DOCUMENTS

| | | |
|---|---|---|
| CN | 106457081 A | 2/2017 |
| JP | S6224922 U | 2/1987 |
| JP | H0634719 U | 5/1994 |
| JP | H07256026 A | 10/1995 |
| JP | 2010520049 A | 6/2010 |
| JP | 2018510051 A | 8/2016 |
| JP | 2017538574 A | 12/2017 |
| JP | 2019013903 A | 1/2019 |
| WO | 2008106490 A1 | 9/2008 |
| WO | 2012/106659 | 8/2012 |
| WO | 2016/115181 | 7/2016 |
| WO | 2017196653 A1 | 11/2017 |
| WO | 2020198681 A1 | 10/2020 |
| WO | 2022067180 A1 | 3/2022 |

OTHER PUBLICATIONS

International Application No. PCT/US2021/052198 filed Sep. 27, 2021, PCT International Preliminary Report on Patentability mailed Mar. 28, 2023, 12 pages.
International Application No. PCT/US2020/025467 filed Mar. 27, 2020, PCT Invitation to Pay Additional Fees mailed May 29, 2020, 10 pages.
International Application No. PCT/US2020/025467 filed Mar. 27, 2020, PCT Invitation to Pay Additional Fees mailed Jun. 9, 2020, 9 pages.
International Application No. PCT/US2020/025467 filed Mar. 27, 2020, PCT International Search Report and Written Opinion mailed Aug. 5, 2020, 15 pages.
International Application No. PCT/US2020/025467 filed Mar. 27, 2020, PCT International Preliminary Report on Patentability, issued Sep. 28, 2021, 10 pages.
Fu et al., Known Knowledge Evidence 1: "Clean Technology and Architectural Design", May 1986, China Architecture & Building Press, 4 pages (with English machine translation).
Gao, Known Knowledge Evidence 2: "Fermentation Equipment", May 1995, China Light Industry Press, 4 pages (with English machine translation).
Su, Known Knowledge Evidence 3: "Q&A on Factory Dust Prevention Technology", Jun. 1986, China Forestry Publishing House, 4 pages (with English machine translation).

* cited by examiner

FILTER MEDIA WITH IMPROVED DUST LOADING

This application is the § 371 U.S. National Stage of International Patent Application PCT/US2020/025467, filed 27 Mar. 2020, which claims priority to U.S. Provisional Patent Application No. 62/825,188, filed Mar. 28, 2019, the contents of which are herein incorporated by reference their entireties.

TECHNOLOGICAL FIELD

The technology disclosed herein generally relates to filter media. More particularly, the technology disclosed herein relates to filter media with improved dust loading.

BACKGROUND

The life of the filter media is limited, at least in part, by the collection of dust and other particulates by the filter media. As the volume and mass of the particulates on the upstream face and inside the filter media builds up, the filter media becomes increasingly resistant to receiving fluid flow. The resistance of airflow through the filter media is reflected by a differential pressure measurement between the upstream side and the downstream side of the filter media if the flow rate is constant, or a reduction in airflow rate if the differential pressure is constant. An increasing differential pressure measurement is indicative of increasing resistance to fluid flow, and a relatively high differential pressure measurement is indicative of the end of the service life of the filter media.

SUMMARY

The technology disclosed herein relates to a filter media that exhibits improved dust loading on the upstream face of the filter media. The improved dust loading can extend the useful life of the filter media.

In some embodiments the filter media has a downstream layer of filter material in a corrugated configuration defining peaks and valleys, and an upstream layer of fibers extending across the peaks of the downstream layer of filter material. The downstream layer of filter material has a capture efficiency of at least 10%. The downstream layer of filter material has a mean corrugation depth of less than 2.0 mm. The upstream layer of fibers has a mean fiber diameter of at least 10 microns. The upstream layer of fibers has less than 10% solidity.

In some such embodiments a plurality of fibers in the upstream layer of fibers are crimped. Additionally or alternatively, the downstream layer of filter material has a capture efficiency from 20% to 40%. Additionally or alternatively, the downstream layer of filter material comprises cellulose fibers. Additionally or alternatively, the cellulose fibers comprise wet-laid cellulose fibers. Additionally or alternatively, the downstream layer of filter material comprises synthetic fibers. Additionally or alternatively, the upstream layer of fibers comprises polymeric fibers. Additionally or alternatively, the downstream layer of filter material comprises fibers having a mean fiber diameter from 4 to 30 microns. Additionally or alternatively, the upstream layer of fibers is not self-supporting. Additionally or alternatively, the upstream layer of fibers is an end layer, or an upstream-most layer and the upstream layer of fibers is in direct contact with the downstream layer of filter material. Additionally or alternatively, the downstream layer of filter material defines corrugations having a mean corrugation depth of greater than 0.23 mm. Additionally or alternatively, the upstream layer of fibers is non-corrugated.

Some embodiments of the technology disclosed herein are directed to a method of constructing a filter media. A spacing structure is created on a layer of filter material. A layer of fibers are deposited across the spacing structure of the filter material. The filter material has a capture efficiency of at least 10%. The layer of fibers has a mean fiber diameter of at least 10 microns.

In some such embodiments, a plurality of fibers in the layer of fibers are crimped. Additionally or alternatively, the layer of filter material has a capture efficiency from 20% to 40%. Additionally or alternatively, the layer of filter material comprises wet-laid cellulose fibers. Additionally or alternatively, the layer of filter material comprises synthetic fibers. Additionally or alternatively, the layer of fibers is not self-supporting. Additionally or alternatively, the layer of filter material comprises fibers having a mean fiber diameter from 4 to 30 microns. Additionally or alternatively, forming the spacing structure comprises forming corrugations in the filter material. Additionally or alternatively, the layer of filter material is corrugated to have a mean corrugation depth of greater than 0.23 mm. Additionally or alternatively, the layer of filter material is corrugated to have a mean corrugation depth of less than 1.0 mm. Additionally or alternatively, forming the spacing structure comprises depositing a spacing structure on an upstream surface of the filter material.

Some other embodiments disclosed herein relate to another filter media having a downstream layer of filter material and an upstream layer of fibers. The downstream layer of filter material has a capture efficiency of at least 10% and the upstream layer of fibers has a mean fiber diameter of at least 10 microns and a solidity of less than 10%. A spacing structure defines a mean void distance between the upstream layer of fibers and the downstream layer of filter material greater than 0.11 mm.

In some such embodiments, the downstream layer of filter material has a spacing structure protruding in a direction perpendicular to a length and a width of the filter media. Additionally or alternatively, the spacing structure has corrugations defined by the downstream layer of filter material. Additionally or alternatively, the spacing structure is embossments defined by the downstream layer of filter material. Additionally or alternatively, the spacing structure is a deposit disposed between the upstream layer of fibers and the downstream layer of filter material. Additionally or alternatively, the upstream layer of fibers is not self-supporting. Additionally or alternatively, the upstream layer of fibers is non-corrugated. Additionally or alternatively, the downstream layer of filter material is non-corrugated. Additionally or alternatively, the mean void distance between the upstream layer of fibers and the downstream layer of filter material is less than 1.0 mm.

It will be understood that downstream and upstream features (e.g. a layer, surface, side, etc) of the filter media, or a component thereof, are arranged such that, in use, the features are respectively arranged upstream and downstream in a flow direction of a fluid being filtered by the filter media.

Capture efficiency may be determined for a non-pleated flat sheet (which can be corrugated or non-corrugated) in accordance with ASTM Standard F1215-89 with 0.78 micron monodisperse polystyrene latex spherical particles at 20 ft./min. (6.1 meters/min).

"Solidity" as used herein is a percentage of the overall volume of the layer that is composed of solid material (rather than gas and space) at a thickness measured at a particular pressure.

"ISO Fine Test Dust" is dust having a size distribution dictated by standard ISO 12103-1 (2016).

The phrase "spacing structure" as used herein is a structure that defines a region of void, or empty, space between a downstream layer of filter material and an upstream layer of fibers, where a void space or empty space is a volume defining gas and space rather than a solid structure such as the layer of filter media, the layer of fibers, or another material or structure. The spacing structure can be defined by the configuration of the downstream layer of filter material or can be a separate component/material disposed between the downstream layer of filter material and the upstream layer of fibers.

It is noted that the figures are rendered primarily for clarity and, as a result, are not drawn to scale. Moreover, various structure/components, including but not limited to fasteners and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

The present technology may be more completely understood and appreciated in consideration of the following detailed description of various embodiments in connection with the accompanying drawings.

DETAILED DESCRIPTION

The technology disclosed herein relates to a filter media that exhibits improved dust loading on the upstream face of the filter media. The improved dust loading can extend the useful life of the filter media. Filter media consistent with the technology disclosed herein are generally fluid filters. In various implementations, the filter media is specifically directed to particulate filters for gaseous fluid such as air.

Figure 1:
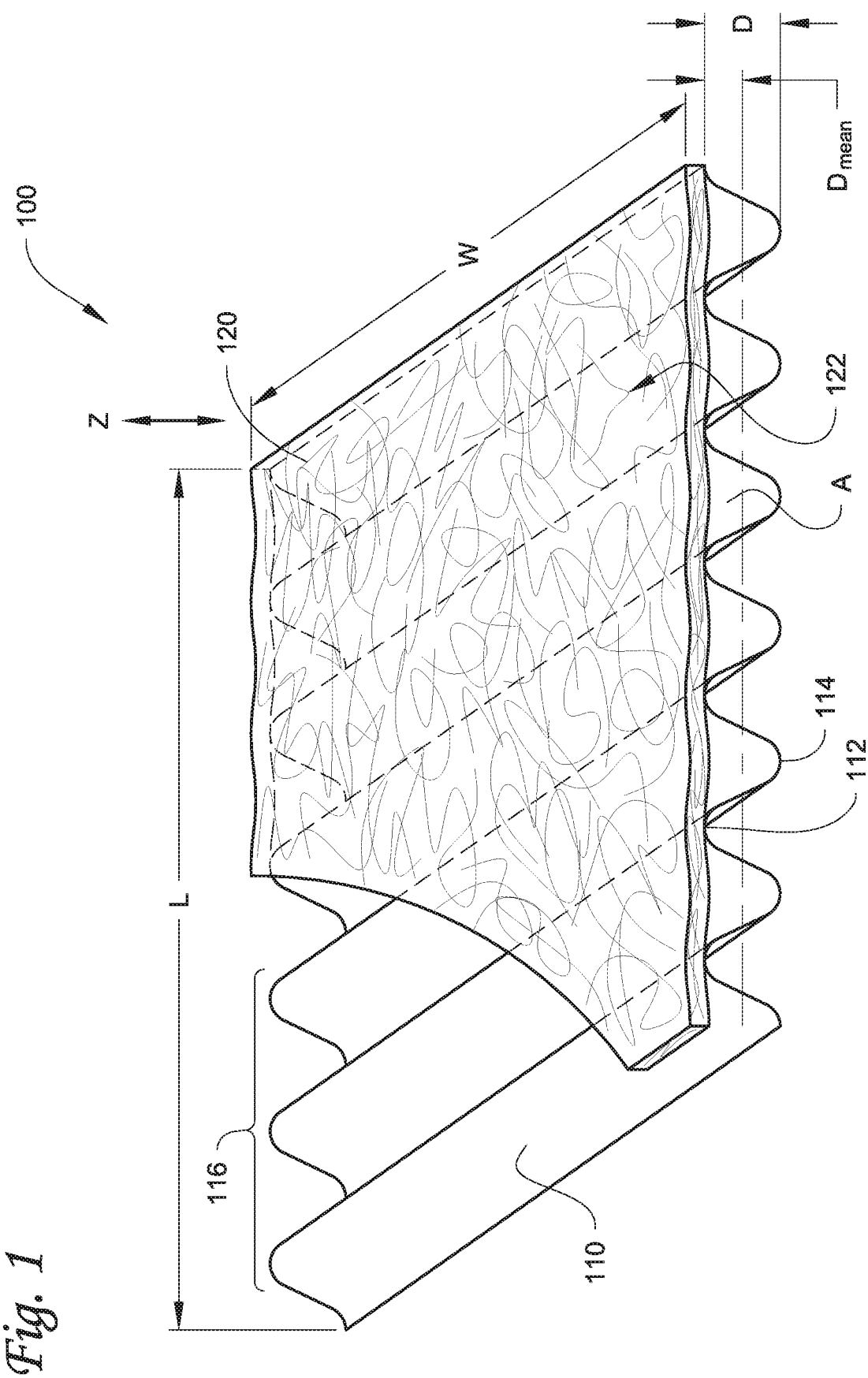
FIG. 1 depicts an example filter media consistent with the technology disclosed herein.

FIG. 1 depicts an example filter media 100 consistent with the technology disclosed herein. The filter media 100 has a downstream layer of filter material 110 and an upstream layer of fibers 120. The downstream layer of filter material 110 is in a corrugated or fluted configuration. The upstream layer of fibers 120 is generally non-corrugated (non-fluted). The example filter media 100 and corresponding components can have the same components, parameters, and properties as other examples described herein, except where explicitly contradictory.

The downstream layer of filter material 110 can be a variety of types of filter material and combinations of types of filter material. In some embodiments, the downstream layer of filter material 110 contains cellulose fibers. In some embodiments, the downstream layer of filter material 110 contains synthetic fibers. In some embodiments, the downstream layer of filter material 110 contains polymeric fibers. The downstream layer of filter material 110 can incorporate multiple layers of filter material, in various embodiments. In various embodiments, the downstream layer of filter material 110 is self-supporting, meaning that, upon undergoing pleating, the downstream layer of filter material 110 exhibits a stiffness allowing it to maintain a pleated configuration under the force of gravity and/or the forces undergone during filtration operations. In some embodiments, corrugations defined by the downstream layer of filter material 110 increase the stiffness of the filter material 110 to be self-supporting. In an example, the stiffness of the filter material 110 can be quantified using Gurley stiffness, which can be at least 2000 mg in some instances. In some other instances the Gurley stiffness can be under 2000 mg, however. The Gurley stiffness can be calculated using a Gurley stiffness tester meeting industry standards TAPPI #T543 OM-16 (2016) and ASTM D6125-97 (2007).

The sizes of the fibers incorporated in the downstream layer of filter material 110 can be dependent on the fiber types. Generally, the fibers incorporated in the downstream layer of filter material 110 will have a range of fiber diameters. The fibers incorporated in the downstream layer of filter material 110 can have a mean fiber diameter ranging from about 4-30 microns. The mean fiber diameter is determined using Scandium M software by ResAlta Research Technologies based in Golden, Colorado. A portion of the filter media is observed through a scanning electron microscope (SEM) such that 30 sample fibers, and representative diameters, can be identified by a user and noted in the software. The software measures a cross section for each fiber and calculates a mean, minimum, maximum and standard deviation for all fibers chosen. In some embodiments the fibers of the downstream layer of filter material have a mean fiber diameter of at least 20 microns. The fibers incorporated in the downstream layer of filter material 110 can have a mean fiber diameter from 4-20 microns, 10-15 microns, 15-20 microns, 20-25 microns, or 10-30 microns, as examples.

The downstream layer of filter material 110 has a capture efficiency of at least 10%, where the capture efficiency is determined for a non-pleated flat sheet (which can be corrugated or non-corrugated) in accordance with ASTM Standard F1215-89 with 0.78 micron monodisperse polystyrene latex spherical particles at 20 ft./min. (6.1 meters/min). In some embodiments the downstream layer of filter material 110 has a capture efficiency of at least 20%. In some embodiments the downstream layer of filter material 110 has a capture efficiency of at least 90%. In some embodiments the downstream layer of filter material 110 has a capture efficiency between 10% and 80%, 20% and 40%, 60% and 99%, or 30% and 70%.

In one example, the downstream layer of filter material 110 has about 80% cellulose fibers by weight. In some examples, the downstream layer of filter material 110 has about 20% binder by weight. The binder can be latex or acrylic, as examples. The basis weight of the downstream layer of filter material 110 is variable, but in one example the basis weight is 96 g/m$^2$.

The corrugations 116 of the downstream layer of filter material 110 defines a plurality of peaks 112 and valleys 114 that alternate across the length L of the filter media 100. "Peak" and "valley" as used herein is not indicative of the specific direction of the corrugation in space, rather, the terms "peak" and "valley" are used herein is to describe corrugations that protrude in opposite directions. While the corrugations depicted herein are generally sinusoidal, the corrugations can have other shapes. In some embodiments the corrugations can incorporate discontinuities in the curvature of the flutes such as one or more fold lines that extend down the length of the flute. Furthermore, while the peaks and valleys are generally equal and opposite, in some embodiments the peaks can have a different size than the valleys.

The corrugations of the downstream layer of filter material 110 can have a mean corrugation depth of greater than 0.23 mm. The corrugations of the downstream layer of filter material 110 generally has a mean corrugation depth of less than 4.0 mm. In various embodiments, the filter material 110 has a mean corrugation depth of less than 2.0 mm. The corrugations of the downstream layer of filter material 110 can have a mean corrugation depth of less than 1.5 mm. In some embodiments the corrugations of the downstream layer of filter material 110 has a mean corrugation depth between 0.23 mm and 0.65 mm. A corrugation depth D is defined as the z-direction distance between a peak 112 and an adjacent valley 114 of the filter material 110, where the z-direction is perpendicular to the length L and the width W of the filter material 110. The mean corrugation depth is an average of a sample of corrugations depths measured across the filter material 110, which can have a sample size of at least 5%, 10%, 15% or 20% of the total corrugation depths of the filter material 110.

The upstream layer of fibers 120 generally extends across the peaks 112 of the downstream layer of filter material 110. In various embodiments, the upstream layer of fibers 120 are not adhered to, and remain uncoupled from, the downstream layer of filter material 110. Alternatively, the upstream layer of fibers 120 can be coupled to the peaks 112 with an adhesive in some embodiments and, in other embodiments, the material forming at least a portion of the fibers within the upstream layer of fibers 120 self-adhere to the downstream layer of filter material 110 forming the peaks 112. The upstream layer of fibers 120 can self-adhere when, for example, uncured (or wet) fibers are deposited across the downstream layer of filter material 110 and left to cure (or dry). In some embodiments, the upstream layer of fibers 120 are loose fibers, meaning that the fibers in the upstream layer of fibers 120 are substantially unbonded to each other. In some such embodiments, the fibers in the upstream layer of fibers 120 are completely unbonded to each other. In some embodiments, the upstream layer of fibers 120 can be a scrim material. The scrim material can be woven, non-woven or knit fibers, for example. In some embodiments, the upstream layer of fibers 120 can have one or more layers combining a first layer of fibers with a scrim material, for example.

The upstream layer of fibers 120 generally extends across a substantial portion of the downstream layer of filter material 110. In some embodiments, the upstream layer of fibers 120 extends across the entire downstream layer of filter material 110. While the downstream layer of filter material 110 is corrugated, the upstream layer of fibers 120 is non-corrugated and is generally planar. However, the upstream layer of fibers 120 is not perfectly planar, because portions of the upstream layer of fibers 120 positioned between adjacent peaks 112 of the downstream layer of filter material 110 can sag in response to gravity. Also, some fibers in the upstream layer of fibers 120 can extend outwardly from the plane defined by the length L and width W directions of the filter media 100 and extend beyond the general plane defined by the upstream layer of fibers 120. Generally speaking, the upstream layer of fibers 120 are substantially absent from the valleys 114 of the downstream layer of filter material 110.

The corrugations 116 defined by the downstream layer of filter material 110 are a type of spacing structure that defines void space between the downstream layer of filter material 110 and the upstream layer of fibers 120. In particular, the corrugations 116 define the spacing structure. In various embodiments, such void space between the layers can be characterized according to the mean void distance $D_{mean}$ defined between the downstream layer of filter material 110 and the upstream layer of fibers 120. In the example currently depicted, the void distance defined between the downstream layer of filter material 110 and the upstream layer of fibers 120 in the width direction W is generally constant. As such, the mean void distance $D_{mean}$ can be calculated by determining the total cross-sectional area A (in a plane extending in the length L and Z-directions) between the downstream layer of filter material 110 and the upstream layer of fibers 120 along the length L, and then dividing the cross-sectional area A by the length L of the filter media 100.

In some embodiments the mean void distance $D_{mean}$ between the downstream layer of filter material 110 and the upstream layer of fibers 120 is greater than 0.11 mm. The mean void distance $D_{mean}$ between the downstream layer of filter material 110 and the upstream layer of fibers 120 is generally less than 2.0 mm. The mean void distance $D_{mean}$ between the downstream layer of filter material 110 and the upstream layer of fibers 120 can be less than 1.0 mm, in various embodiments. The mean void distance $D_{mean}$ between the downstream layer of filter material 110 and the upstream layer of fibers 120 is can be less than 0.7 mm.

For purposes of the present disclosure, the total cross-sectional area and the mean void distance $D_{mean}$ between the downstream layer of filter material 110 and the upstream layer of fibers 120 is a theoretical calculation that assumes the fibers in the upstream layer of fibers 120 do not extend past the peaks 112 towards the valleys 114 of the downstream layer of filter material 110 (into the void space between the layers 110, 120). In other words, the calculation assumes that the downstream side of the upstream layer of fibers 120 is perfectly planar.

Generally, the solidity of the upstream layer of fibers 120 is less than the solidity of the downstream layer of filter material 110. "Solidity" as used herein is a percentage of the overall volume of the layer that is composed of solid material (rather than gas and space) at a thickness measured at a particular pressure. Solidity is calculated by the following equation:

$$\text{Solidity} = \frac{Density_{Mat'l}}{Density_{Comp}},$$

where the density of the material (such as the layer of filter material 110 or layer of fibers 120) is divided by the density of the constituent components forming the material (such as the fiber density in the layer of fibers 120). The density of the material can be calculated by the following equation:

$$Density_{Mat'l} = \frac{\text{Basis } Weight_{Mat'l}}{\text{Thickness}},$$

where the thickness is of the material (such as the layer of fibers 120). For purposes of the present disclosure, thickness of the material is determined with a no-load caliper (particularly an Ames Thickness Tester manufactured by B.C. Ames Incorporated based in Framingham, Massachusetts) having a diameter of 1.129" (1 square inch) that exerts 0.07 psi on the material. As such, the solidities of the materials as disclosed herein are understood to be calculated based on the 0.07 psi exerted on the material to attain the thickness measurement.

The upstream layer of fibers 120 generally has a solidity of less than 10%. In some embodiments the upstream layer of fibers 120 has a solidity of less than 8%. In some embodiments the upstream layer of fibers 120 has a solidity from 2% to 9%.

The upstream layer of fibers 120 generally has basis weight that is less than the basis weight of the downstream layer of filter material 110. The upstream layer of fibers 120 can have a basis weight from 1 to 45 g/m² or 15 to 40 g/m². In some embodiments the basis weight of the upstream layer of fibers is about 21 g/m² or 30 g/m². In some embodiments the basis weight of the upstream layer of fibers 120 can have a basis weight ranges from 2-10 g/m².

In various embodiments, the upstream layer of fibers 120 contains fibers having a mean fiber diameter of greater than 10 microns. In various embodiments, the upstream layer of fibers 120 contains fibers having a mean fiber diameter of at least 15 microns. In some embodiments the upstream layer of fibers 120 contains fibers having a mean fiber diameter of at least 20 microns with a standard deviation of 2. The upstream layer of fibers 120 contains fibers having a mean fiber diameter of less than 1.0 mm. The upstream layer of fibers 120 generally contains fibers having a mean fiber diameter of less than 0.5 mm. The upstream layer of fibers 120 can contain fibers having a mean fiber diameter of less than 0.1 mm. In some embodiments the upstream layer of fibers 120 can contain fibers that are coarser than the fibers contained in the downstream layer of filter material 110.

The upstream layer of fibers 120 can contain various types of fibers and combinations of fibers. The fibers in the upstream layer of fibers 120 can be substantially continuous, such as meltblown or spunbonded fibers, discontinuous, or combinations thereof. In some embodiments, the upstream layer of fibers 120 are polymeric fibers. In some embodiments, a plurality of the fibers in the upstream layer of fibers 120 are crimped, such as example crimp 122. The crimp 122 in the fiber is a discontinuity in the curvature of the fiber similar to a fold or a crease. Such crimped fibers can add loft to the upstream layer of fibers 120, which can reduce the relative solidity by, for example, increasing the thickness of the upstream layer of fibers 120 or by reducing the basis weight at the same thickness of the upstream layer of fibers 120.

In various embodiments, the upstream layer of fibers 120 is not self-supporting, meaning that the upstream layer of fibers 120 does not exhibit stiffness and cannot be pleated to maintain a pleated configuration under the force of gravity. The upstream layer of fibers 120 can directly contact the downstream layer of filter material 110. The upstream layer of fibers 120 can be directly coupled to the downstream layer of filter material 110, meaning that there are no intervening materials between the upstream layer of fibers 120 and the downstream layer of filter material 110 except for an adhesive (where an adhesive is used).

While the filter media 100 of the present application can incorporate various other constituent layers, in various embodiments, the upstream layer of fibers 120 is the end layer (upstream-most layer) in the filter media. As such, the upstream layer of fibers 120 is positioned to maximize exposure to dust entering the filter media 100.

Figure 2:
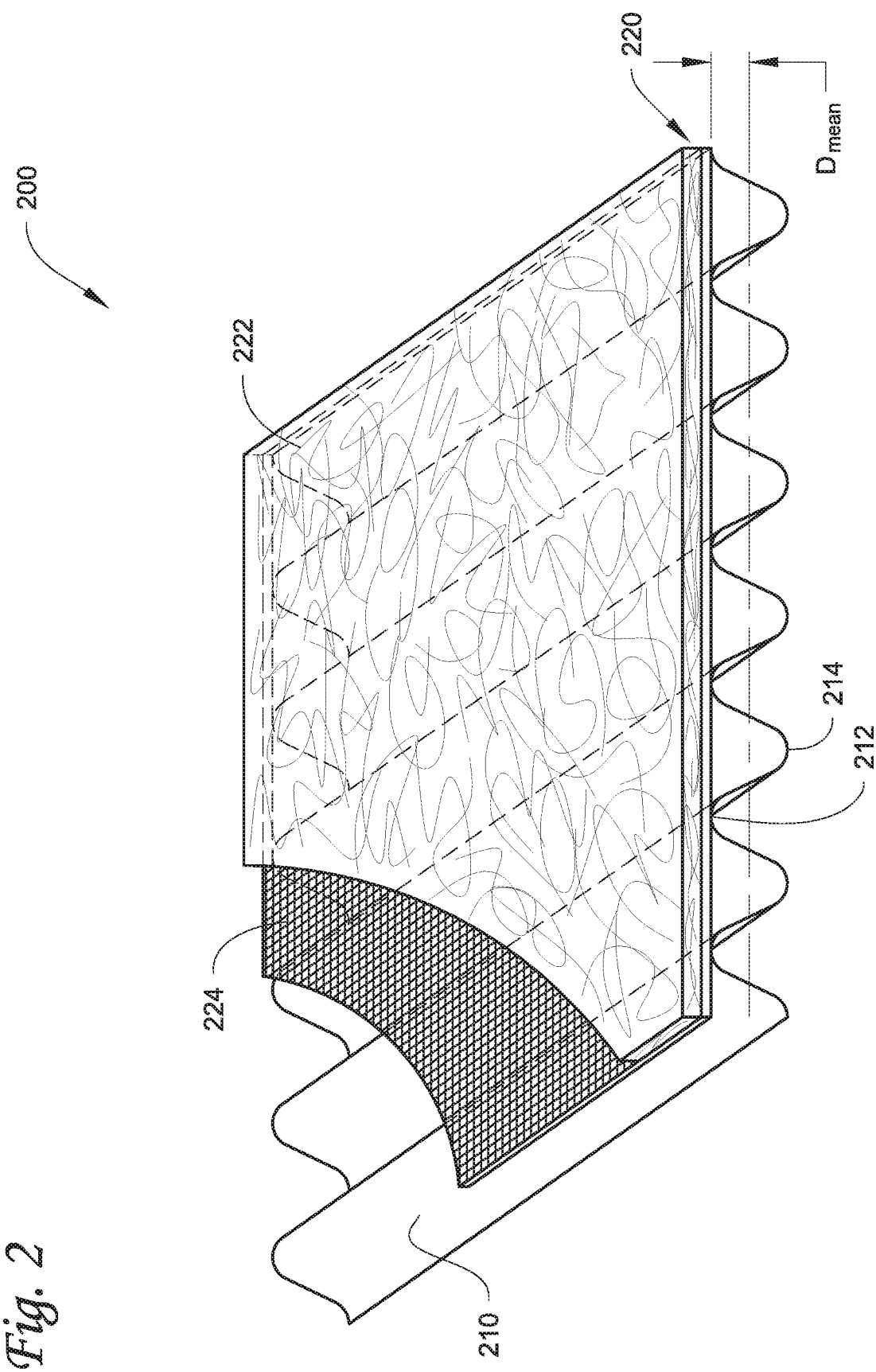
FIG. 2 depicts another example filter media consistent with the technology disclosed herein.

As discussed above, in some embodiments the upstream layer of fibers can have multiple layers, such as a first layer of fibers disposed on a scrim material, which is depicted in FIG. 2. Similar to the embodiment described above with reference to FIG. 1, the currently-described filter media 200 has a downstream layer of filter material 210 and an upstream layer of fibers 220. The downstream layer of filter material 210 is in a corrugated configuration and defines a plurality of alternating peaks 212 and valleys 214 along its length. The upstream layer of fibers 220 extends across the peaks 212 of the downstream layer of filter material 210. The upstream layer of fibers 220 is generally non-corrugated and can be considered generally planar. The example filter media 200 and corresponding components can have the same components, parameters, and properties as other examples described herein, except where explicitly contradictory.

Unlike the embodiment described with reference to FIG. 1, in the current example, the upstream layer of fibers 220 has a first layer of fibers 222 and a support layer 224. The support layer 224 is disposed between the downstream layer of filter material 210 and the first layer of fibers 222. The support layer 224 makes contact with the peaks 212 defined by the corrugations of the downstream layer of filter material 210. The support layer 224 can be coupled to the peaks 212 with adhesive or through alternate approaches, and in some embodiments the support layer 224 and the downstream layer of filter material 210 are uncoupled. In some examples, the support layer 224 is generally self-supporting, meaning that the support layer 224 has stiffness through which the support layer 224 can be pleated, while in other embodiments the support layer 224 is not self-supporting. The support layer 224 can be a variety of materials and combinations of materials and, in some embodiments the support layer 224 is a mesh, such as a wire or polymeric mesh. Generally, the support layer 224 itself does not exhibit a filtering efficiency or pressure drop when filtering 0.78-micron particles.

Figure 3:
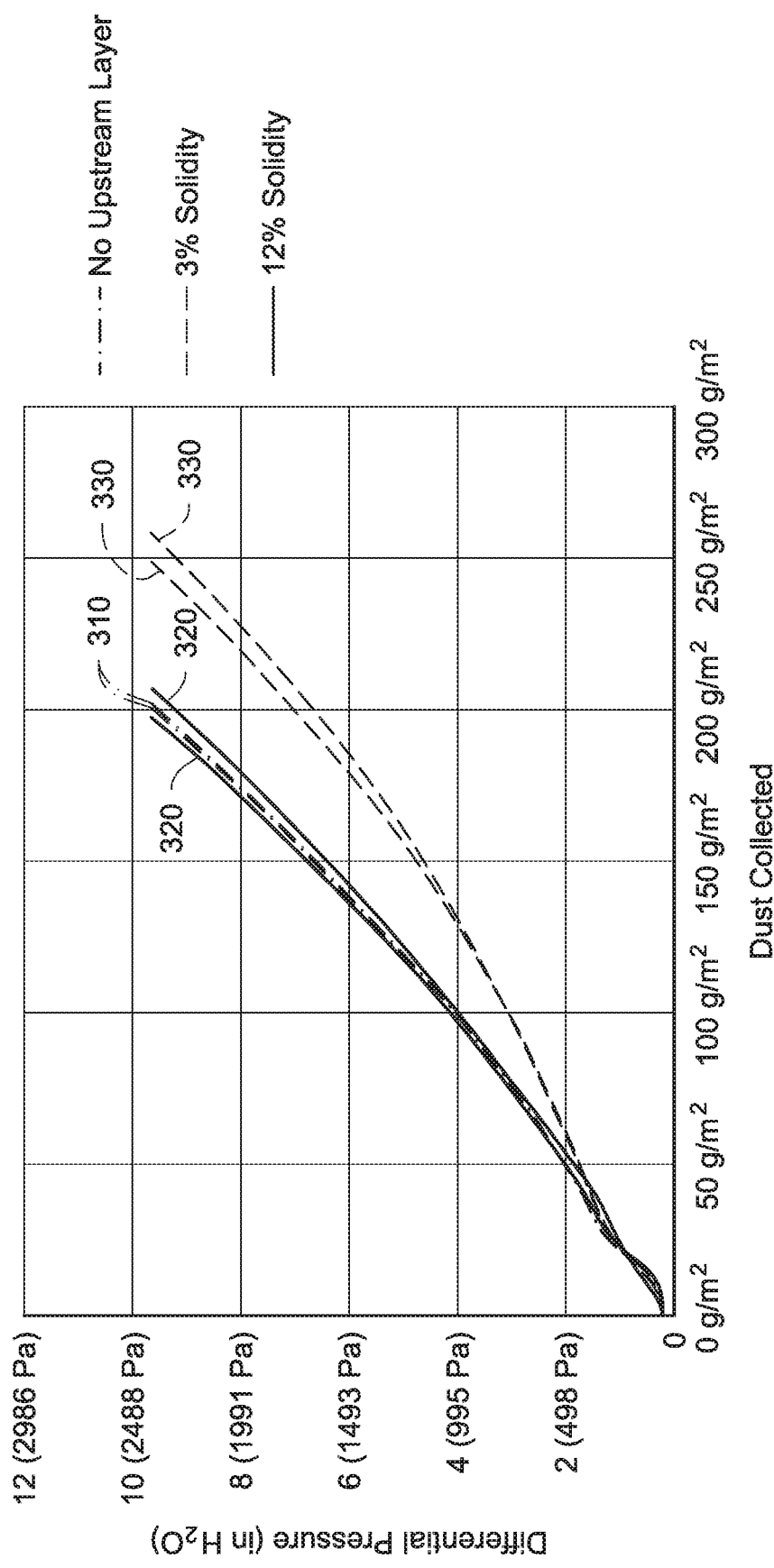
FIG. 3 is a graph showing the relationship between differential pressure and dust collected according to filter media examples.

FIG. 3 depicts test results measuring dust collected and differential pressure for three different example filter medias, using ISO Fine Test Dust. Each of a first comparative example 310, second comparative example 320, and third comparative example 330 each incorporate a non-corrugated downstream layer of filter material that has a relative upstream scrim layer abutting a relative downstream sheet of cellulose media. Each non-corrugated downstream layer of filter material has the same composition and filtration properties.

The first comparative example 310 is the downstream layer of filter material alone. The second comparative example 320 and the third comparative example 330 each incorporate an upstream layer of fibers abutting the downstream layer of filter material. Each upstream layer of fibers contains polyethylene-polypropylene (PE/PP) bicomponent fibers that are wet-laid onto the upstream surface of the scrim layer. A first upstream layer of fibers used in the second comparative example 320 has a solidity of 12%, a basis weight of 21.5 g/m$^2$, and a mean fiber diameter of 30.45 microns. A second upstream layer of fibers in the third comparative example 330 has a solidity of 3%, a basis weight of 21.5 g/m$^2$, and a mean fiber diameter of 27 microns. For testing each comparative example, the perimeters of the scrim (having the upstream layer of fibers for the second and third comparative examples) and the sheet of cellulose media are clamped together by testing equipment. Each of the comparative examples 310, 320, 330 were tested twice. The graph of FIG. 3 demonstrates that the third comparative example 330 has lower differential pressure across the filter media than the first comparative example 310 and the second comparative example 320 after loading dust above about 50 g/m$^2$. The data suggests that the presence of an upstream layer of fibers having a solidity at 12% does not have a notable impact on the life of the filter media, but the presence of an upstream layer of fibers having a solidity of 3% does have a notable impact on the life of the filter media. In various embodiments consistent with the current technology, the upstream layer of fibers has a solidity of less than 10%.

Figure 4:
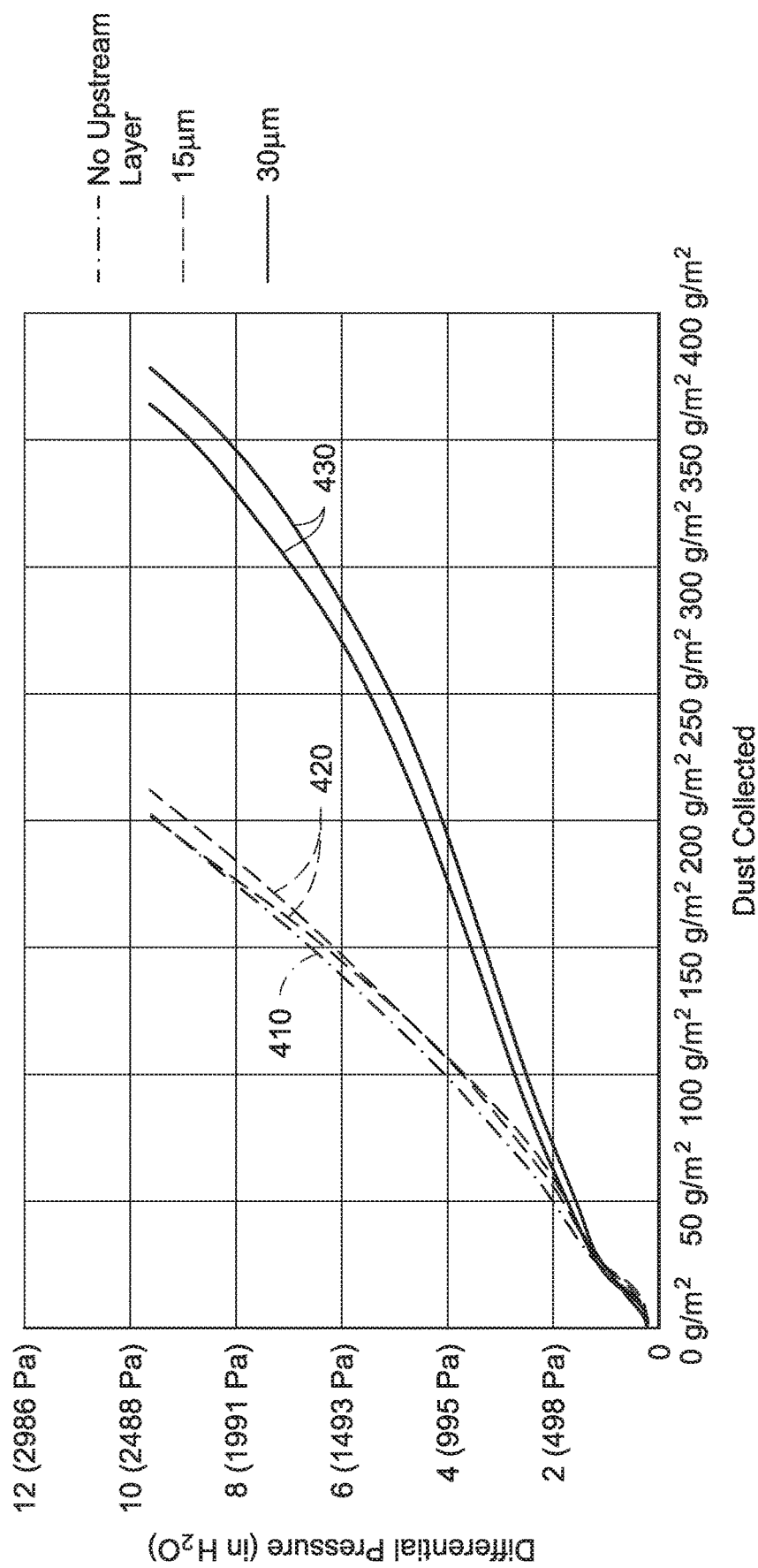
FIG. 4 is a graph showing the relationship between differential pressure and dust collected according to further filter media examples.

FIG. 4 depicts further test results measuring dust collected and differential pressure for three different example filter medias, using ISO Fine Test Dust. A fourth comparative example 410, fifth comparative example 420, and sixth comparative example 430 each uses a non-corrugated downstream layer of filter material discussed above with reference to FIG. 3 (which has a relatively upstream scrim layer abutting a relatively downstream sheet of cellulose media). The fourth comparative example 410 is the downstream layer of filter material alone, where the scrim layer and the cellulose media are clamped together about their perimeters for testing. The fifth comparative example 420 and the sixth comparative example each incorporate an upstream layer of fibers wet-laid onto the scrim layer. A third upstream layer of fibers of the fifth comparative example 420 is polyethylene terephthalate (co-PET) bicomponent fibers having a 21.5 g/m$^2$ basis weight, 6% solidity, and fibers having a mean fiber diameter of 15 microns. A fourth upstream layer of fibers of the sixth comparative example 430 is PE/PP bicomponent fibers having a 21.5 g/m$^2$ basis weight, a 3% solidity, and fibers having a mean fiber diameter of 30 microns. The testing equipment clamps the scrim having the upstream fiber layer to the sheet of cellulose media about their respective perimeters for testing.

The graph of FIG. 4 demonstrates that the sixth comparative example 430 has a lower differential pressure than the fourth comparative example 410 and the fifth comparative example 420 after loading dust at least above about 50 g/m$^2$. The data suggests that the presence of an upstream layer of fibers having a mean fiber diameter of 15 microns does not appear to advantageously impact the life of the filter media, but the presence of an upstream layer of fibers having a mean fiber diameter of 30 microns does appear to advantageously impact the life of the filter media. In some embodiments, the upstream layer of fibers has a mean fiber diameter of greater than 15 microns. In various embodiments consistent with the current technology, the upstream layer of fibers has a mean fiber diameter of at least 20 microns with a standard deviation of 2.

As stated above, ISO Fine Test Dust was used in the testing associated with FIG. 4, where the dust particles have a particular size range and distribution. In some other implementations, where the particles to be filtered have a different size range and/or size distribution than ISO Fine Test Dust, different mean fiber diameters of the fibers in the upstream layer of fibers may demonstrate an improvement in filter media life compared to media lacking an upstream layer of fibers. In some such implementations, the upstream layer of fibers can have a mean fiber diameter of 10 microns, 12 microns, 14 microns or 15 microns. In some such implementations, the upstream layer of fibers can have a mean fiber diameter of at least 10 microns, 12 microns, 14 microns or 15 microns.

Figure 5:
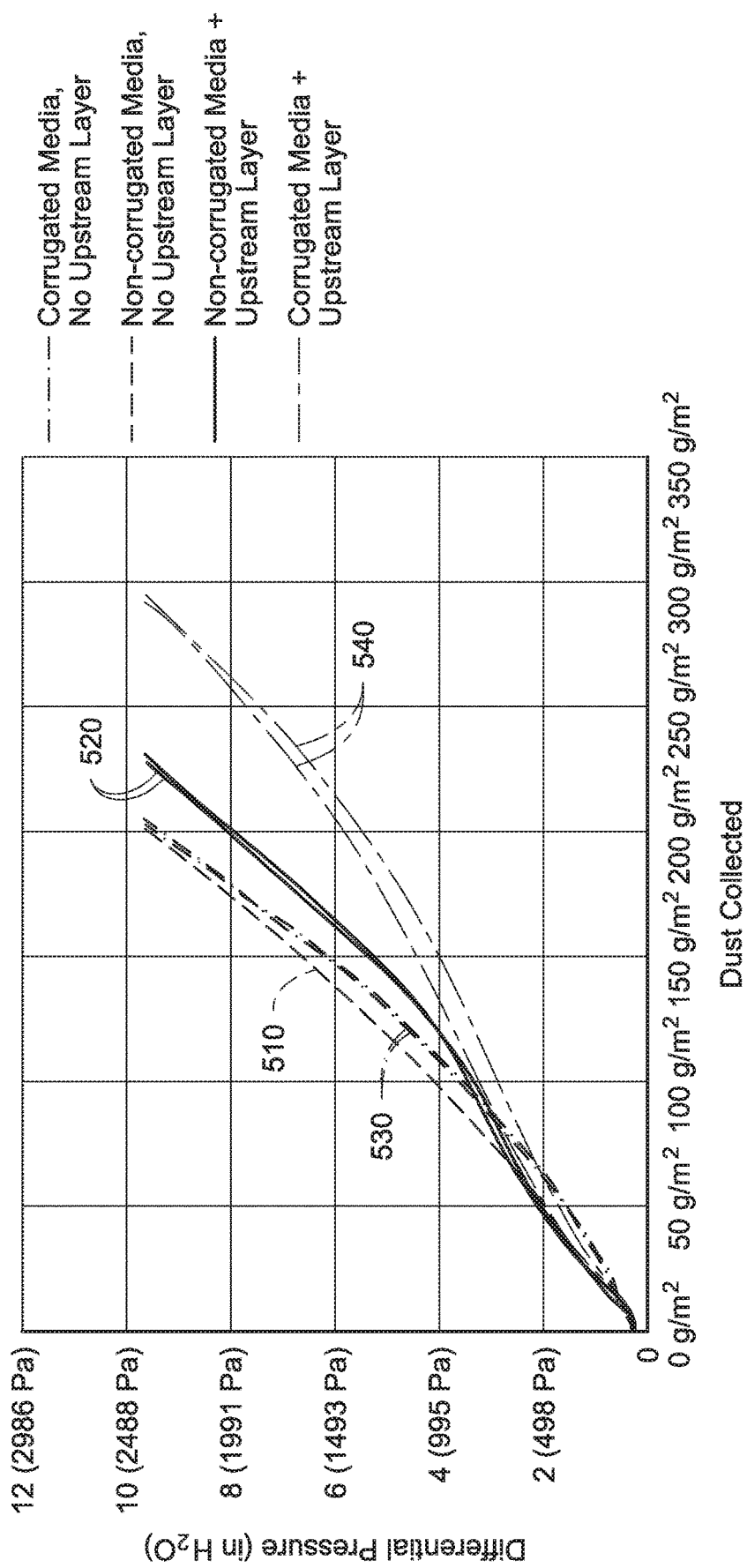
FIG. 5 is a graph showing the relationship between differential pressure and dust collected according to further filter media examples.

FIG. 5 depicts further test results measuring dust collected and differential pressure for four different example filter medias, using ISO Fine Test Dust. Each of the comparative examples incorporates a downstream layer of filter material that is a sheet of cellulose media. Each sheet of cellulose media has about 80% cellulose fibers and 20% binder by weight, and a mean fiber diameter of 15.8 microns.

A seventh comparative example 510 and an eighth comparative example 520 each have a non-corrugated sheet of cellulose media having a basis weight of about 96.1 g/m$^2$ and a capture efficiency of 25%. The seventh comparative example 510 is the sheet of cellulose media alone. The eighth comparative example 520 incorporates an upstream layer of fibers that is a scrim layer constructed of polyethylene terephthalate/polypropylene (PET/PP) bicomponent fibers having a 30 g/m$^2$ basis weight, a 7% solidity, and contains fibers having a mean fiber diameter of 38 microns.

The sheets of cellulose media in a ninth comparative example 530 and a tenth comparative example 540 each have a basis weight of 114.5 g/m$^2$ and a capture efficiency of 33%. The sheets of cellulose media of the ninth comparative example 530 and the tenth comparative example 540 are each corrugated to define an average corrugation depth of 0.58 mm. The ninth comparative example 530 is the sheet of cellulose media alone in a corrugated configuration. The tenth comparative example 540 additionally has an upstream layer of fibers abutting the upstream side of the corrugated filter material. The upstream layer of fibers in the tenth comparative example 540 is the same as the upstream layer of fibers of the eighth comparative example 520. As such, the layer of fibers in the tenth comparative example 540 has a 30 g/m$^2$ basis weight, a 7% solidity, and contains fibers having a mean fiber diameter of 38 microns.

For testing, the filter medias of each of the examples are clamped about their respective perimeters. Where the example incorporates an upstream layer of fibers, the upstream layer of fibers and the sheet of cellulose media are clamped together about their perimeters for testing, such that the upstream layer of fibers abuts the upstream side of the corrugated sheet of cellulose media.

FIG. 5 appears to demonstrate that the combination of a corrugated downstream media layer with a non-corrugated upstream fiber layer (of the tenth comparative example 540) has a lower differential pressure after loading dust at least above about 100 g/m², which advantageously impacts the life of the filter media.

Figure 6:
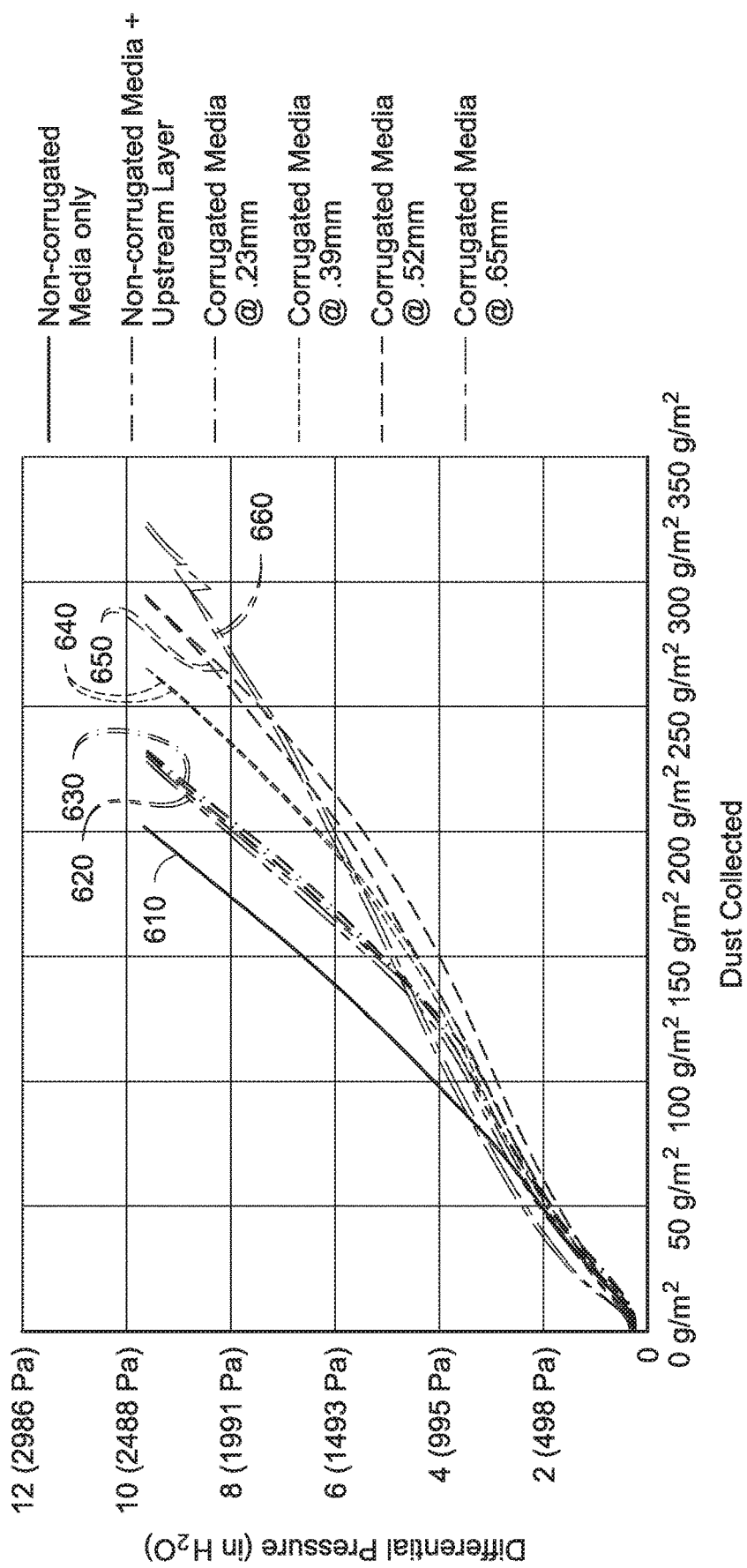
FIG. 6 is a graph showing the relationship between differential pressure and dust collected according to further filter media examples.

FIG. 6 depicts test results again measuring dust collected and differential pressure for six different example filter medias. Each example filter media has a downstream layer of filter material that is a sheet of cellulose media consistent with the seventh and eighth comparative examples, discussed above. An eleventh comparative example 610 is a non-corrugated sheet of the cellulose media alone. A twelfth comparative example 620 is a non-corrugated sheet of the cellulose media abutting an upstream layer of fibers. A thirteenth comparative example 630, fourteenth comparative example 640, fifteenth comparative example 650 and sixteenth comparative example 660 each are downstream corrugated sheets of cellulose media having an abutting upstream layer of fibers. The upstream layer of fibers in each of the relevant comparative examples in FIG. 6 is the same as the layer of fibers in the tenth comparative example 540, discussed above.

The thirteenth, fourteenth, fifteenth and sixteenth comparative examples have corrugations with different mean corrugation depths. The corrugations defined by the thirteenth comparative example 630 have a mean corrugation depth of 0.23 mm. The corrugations defined by the fourteenth comparative example 640 have a mean corrugation depth of 0.39 mm. The corrugations defined by the fifteenth comparative example 650 have a mean corrugation depth of 0.52 mm. The corrugations defined by the sixteenth comparative example 660 have a mean corrugation depth of 0.65 mm.

The data reflects that incorporating an upstream layer of fibers to a non-corrugated downstream layer of filter material (twelfth comparative example 620) results in a notable increase in filter life compared to a non-corrugated layer of filter material alone (eleventh comparative example 610). Further, in a filter media structure incorporating a non-corrugated upstream layer of fibers, a downstream filter material having a maximum corrugation depth of 0.23 mm (of the thirteenth comparative example 630) appears to be very similar (or a very slight decrease) in differential pressure compared to a filter media structure with an upstream fiber layer and a downstream filter material having no corrugations (twelfth comparative example 620) as dust is loaded on each of the filter medias.

Each of the comparative examples incorporating a corrugated downstream layer of filter material (13$^{th}$-16$^{th}$ comparative examples) has lower pressure drop than the comparative example having a non-corrugated downstream layer (twelfth comparative example 620) at least at a minimum dust loading of 150 g/m² (in the case of the sixteenth comparative example), but in some examples at a minimum dust loading of 50 g/m² or 100 g/m².

The results reflected in FIG. 6 are surprising. The sixteenth comparative example 660 appears to have a pressure drop that exceeds the pressure drop of the remainder of the comparative examples under a dust loading of about 70 g/m². The media having a maximum corrugation depth of 0.23 mm (of the thirteenth comparative example 630) performs very similarly to non-corrugated media a filter media structure with a downstream filter material having no corrugations (twelfth comparative example 620) as dust is loaded on each of the filter media.

Figure 11:
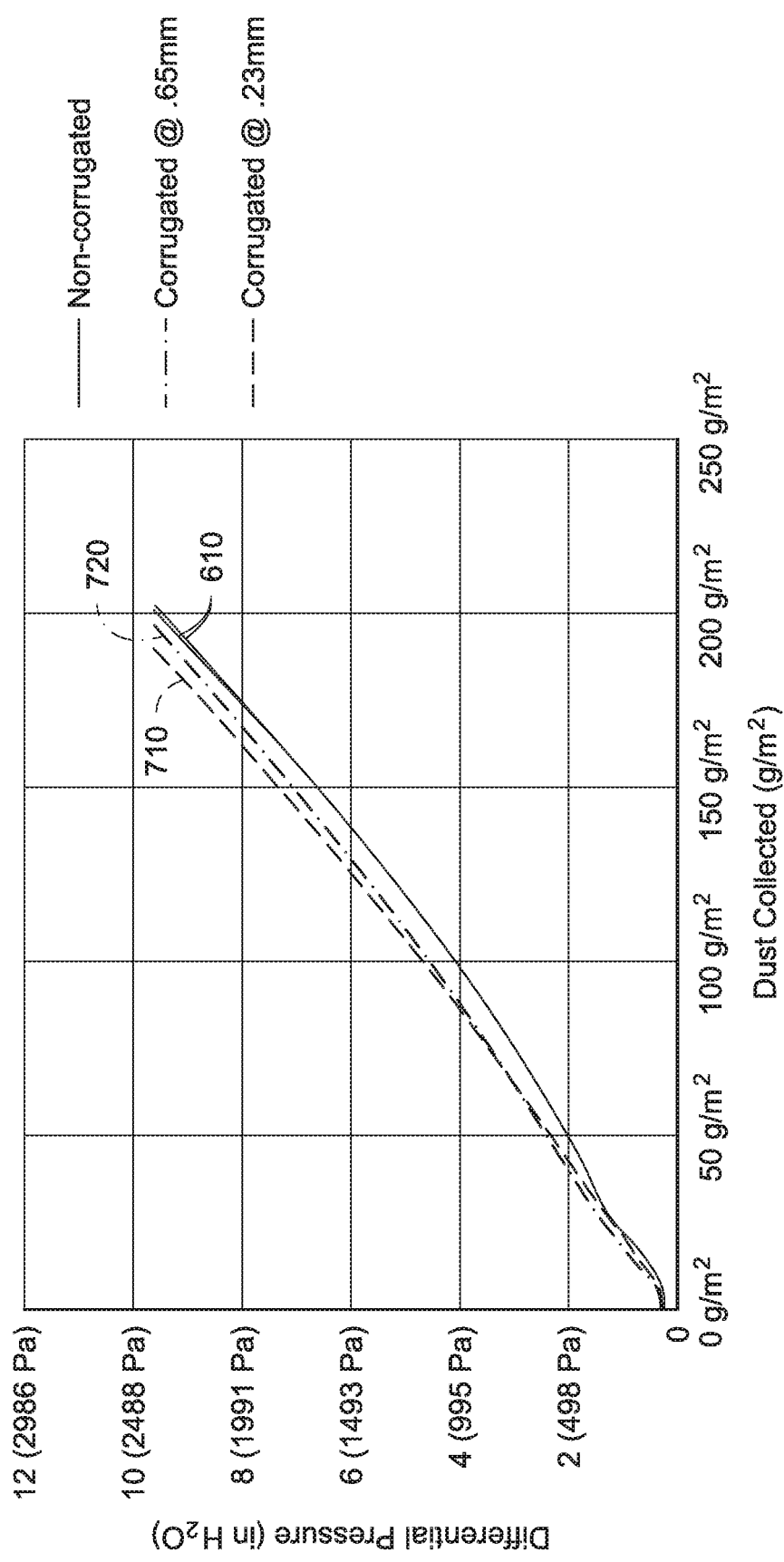
FIG. 11 is a graph showing a relationship between differential pressure and dust collected according to corrugation depth of various filter material layers.

A test was conducted to determine whether the pressure drop improvement reflected in FIG. 6 is a function of the mean corrugation depth of the downstream layer of filter material. FIG. 11 reflects data associated with the eleventh comparative example 610 of FIG. 6, which is the non-corrugated sheet of cellulose media alone (without an upstream layer of fibers), compared to two corrugated sheets of the cellulose media alone (each without an upstream layer of fibers) having different mean corrugation depths. A first cellulose media 710 has a mean corrugation depth of 0.65 mm, and a second cellulose media 720 has a mean corrugation depth of 0.23 mm. Surprisingly, FIG. 11 appears to demonstrate that, absent an upstream layer of fibers, the mean corrugation depth of the cellulose media alone does not appear to reduce the differential pressure of the media as dust is loaded onto the media. In fact, the corrugations of the first cellulose media 710 and the second cellulose media 720 appear have a slightly increased differential pressure as dust is loaded onto the media, as compared to the non-corrugated cellulose media of the eleventh comparative example 610.

Figure 7:
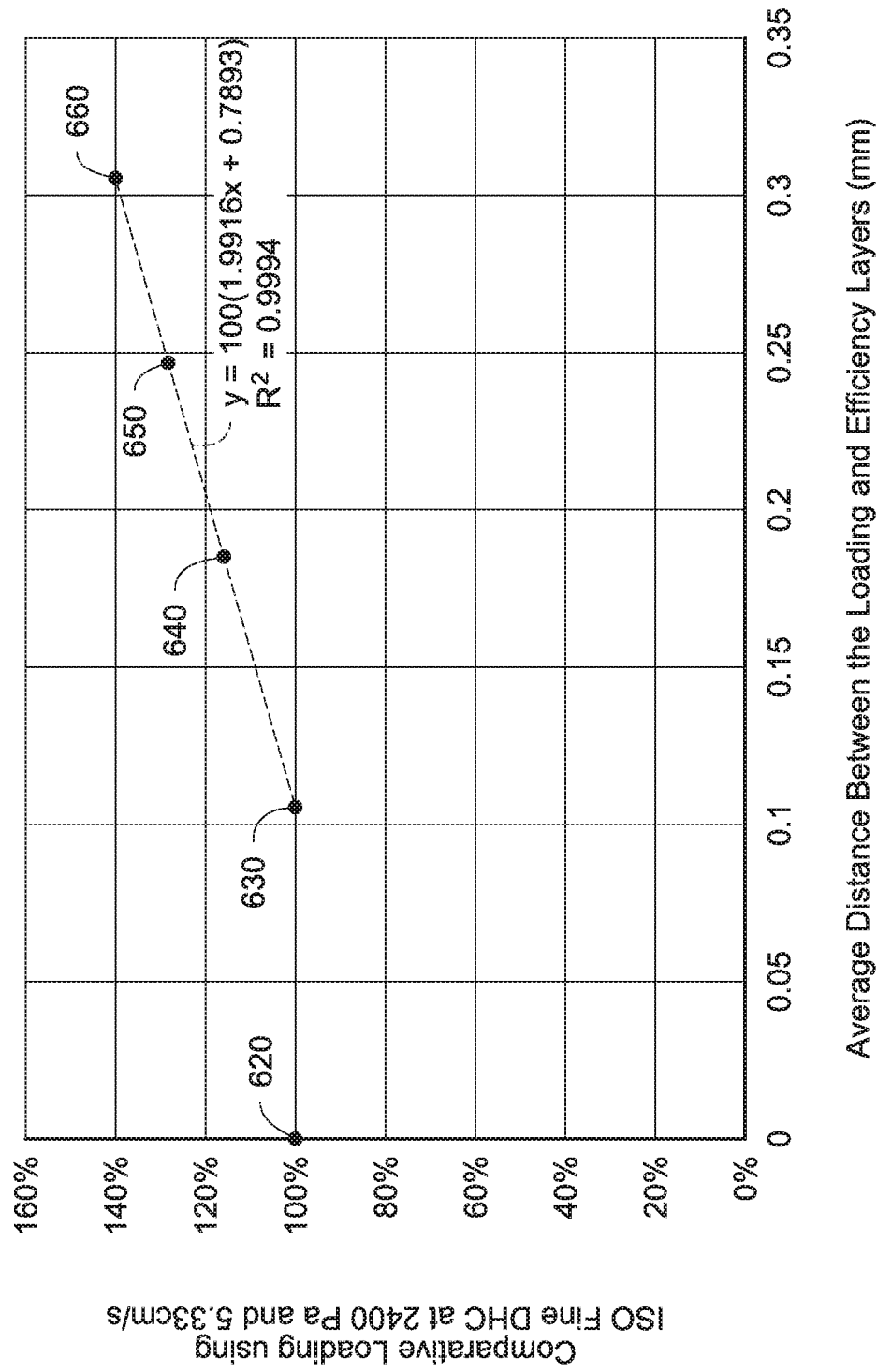
FIG. 7 is a graph showing a relationship between mean void distance between layers and improvement in dust holding capacity for various filter media examples.

On the other hand, FIG. 7 reflects the improvement in dust holding capacity of the twelfth 620, thirteenth 630, fourteenth 640, fifteenth 650 and sixteenth 660 comparative examples (discussed above with reference to FIG. 6) according to the mean void distance between the upstream layer of fibers and the downstream layer of filter material. The dust holding capacity is determined at a 9.6 inch-H$_2$O (2388 Pa) pressure drop, a 10.5 ft/min (5.33 cm/sec) flow rate with ISO Fine Test Dust. The improvement in dust holding capacity is a percentage based on the dust holding capacity of the twelfth comparative example 620, which has a mean void distance of zero between the upstream layer of fibers and the downstream layer of filter material because the downstream layer of filter material is non-corrugated. Each of the thirteenth 630, fourteenth 640, fifteenth 650 and sixteenth 660 comparative examples had a mean void distance between the upstream layer of fibers and the downstream layer of filter material that was calculated as described above in the discussion of calculating $D_{mean}$ in FIG. 1.

The graph of FIG. 7 reflects that, at the above-described test parameters, the dust holding capacity improves almost linearly with an increase in the mean void distance between the upstream layer of fibers and the downstream layer of filter material when the mean void distance is above 0.11 mm. When the upstream layer of fibers and/or the downstream layer of filter material has alternate configurations (such as being constructed of alternate types of fibers and combinations of fibers) the minimum mean void distance can be different than 0.11 mm. The "minimum mean void distance" is defined as the mean void distance between the layers above which the dust holding capacity of the media exhibits improvement compared to a mean void distance between the layers of about zero.

Figure 8:
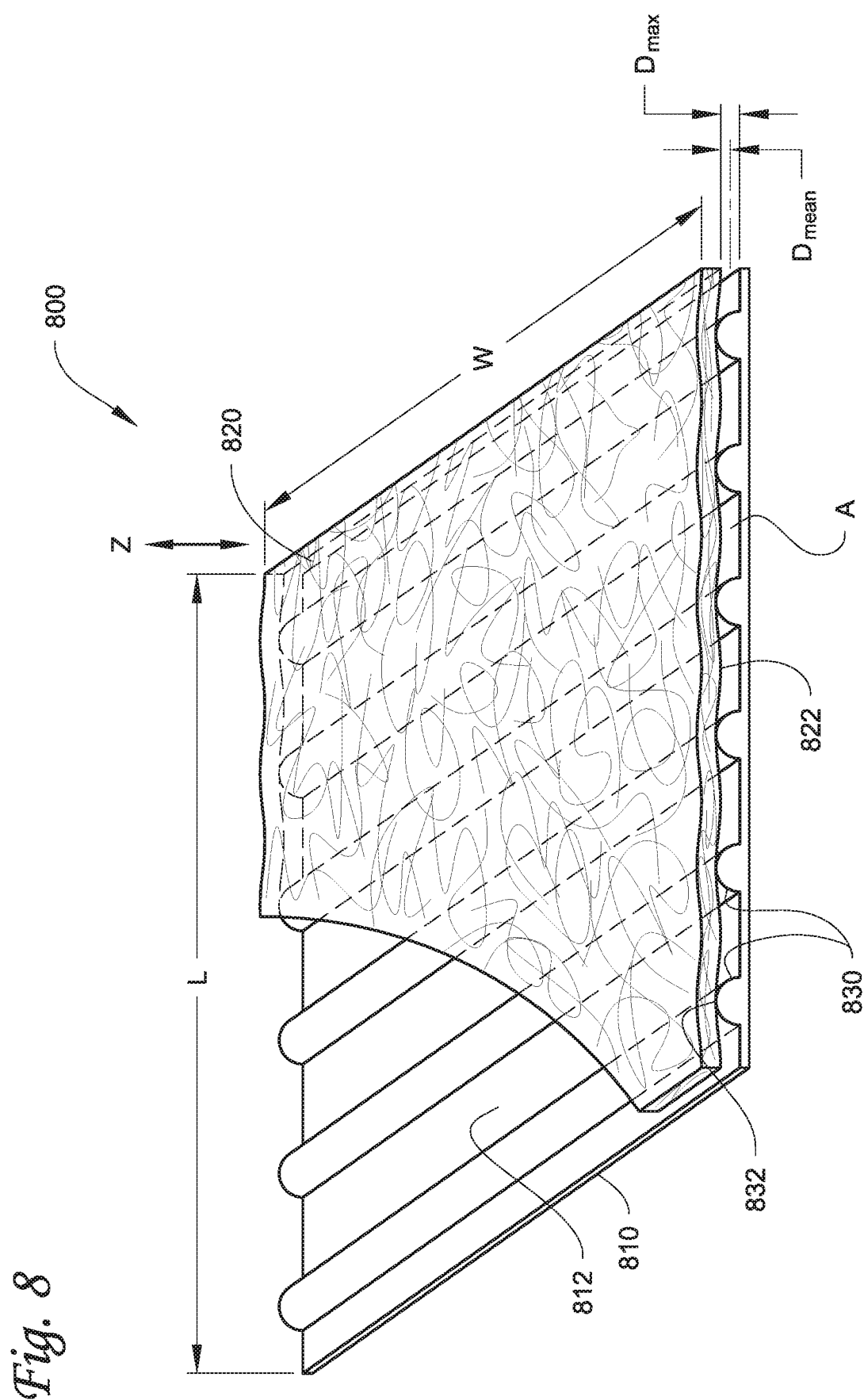
FIG. 8 is another example filter media consistent with the technology disclosed herein.

FIG. 8 depicts another example filter media 800 consistent with the technology disclosed herein. Similar to example embodiments depicted in FIGS. 1 and 2, the filter media 800 has a downstream layer of filter material 810 abutting an upstream layer of fibers 820. The upstream layer of fibers 820 can have a support layer similar to that described above with reference to FIG. 2. The upstream layer of fibers 820 can be in direct contact with a spacing structure 830 on the downstream layer of filter material 810. The example filter media 800 and corresponding components can have the same components, parameters, and properties as other examples described herein, except where explicitly contradictory.

While the downstream layer of filter material 810 is non-corrugated, the currently-depicted example filter media 800 demonstrates another structure for achieving a particular mean void distance $D_{mean}$ between the upstream layer of fibers 820 and the downstream layer of filter material 810 in the z-direction, such as a mean void distance $D_{mean}$ greater than 0.11 mm and less than 2.0 mm, 1.0 mm or 0.7 mm. In particular, the spacing structure 830 on the downstream layer of filter material 810 protrudes in the z-direction towards the upstream layer of fibers 820. In the current example, the spacing structure 830 is a series of spaced elongate ribs that extend along the width W of the filter media 800 and are spaced across the length L of the filter media 800 at a particular increment.

The spacing structure 830 can be defined by the downstream layer of filter material 810 itself. For example, the spacing structure 830 can be formed by shaping the downstream layer of filter material 810 such as through embossing. In some other embodiments, the spacing structure 830 can be a separate component that is deposited on the upstream side 812 of the downstream layer of filter material 810 or the downstream surface 822 of the upstream layer of fibers 820 before the upstream layer of fibers 820 is deposited on the upstream side 812 of the downstream layer of filter material 810. As examples, the spacing structure 830 can be a hot melt polymer, epoxy resin, or adhesive that is deposited in an uncured state and then allowed to cure. As another example, the spacing structure can be a pre-formed structural component that is coupled to one or both of the upstream layer of fibers 820 and the downstream layer of filter material 810.

Because the spacing between the layers of the filter media 800 is generally uniform along the width W direction, the mean void distance $D_{mean}$ between the upstream layer of fibers 820 and the downstream layer of filter material 810 will be about equal to the mean void distance $D_{mean}$ in the length L direction. The mean void distance $D_{mean}$ in the length L direction can be calculated, for example, by calculating a total cross-sectional area A (in a plane extending in the length L and z-directions) of the void between the layers and dividing the cross-sectional area A by the length L, similar to as discussed above with reference to FIG. 1 downstream layer of filter material. The mean void distance $D_{mean}$ will generally be less than a maximum void distance $D_{max}$ between the layers, where the maximum void distance $D_{max}$ between the layers can be calculated based on the z-direction void distance between a peak 832 of the spacing structure 830 and the upstream side 812 of the downstream layer of filter material 810.

The maximum void distance $D_{max}$ can be calculated as an average similar to the mean corrugation depth, as discussed above with reference to FIG. 1. At locations where the spacing structure 830 makes contact with the downstream layer of filter material 810 and the upstream layer of fibers 820, the void distance between the layers 810, 820 is zero because there is no void between the layers 810, 820 at the spacing structure 830. In some embodiments the average maximum void distance $D_{max}$ is less than 4.0 mm. In some embodiments the average maximum void distance $D_{max}$ is less than 2.0 mm. In some embodiments the average maximum void distance $D_{max}$ is less than 1.5 mm.

Figure 9:
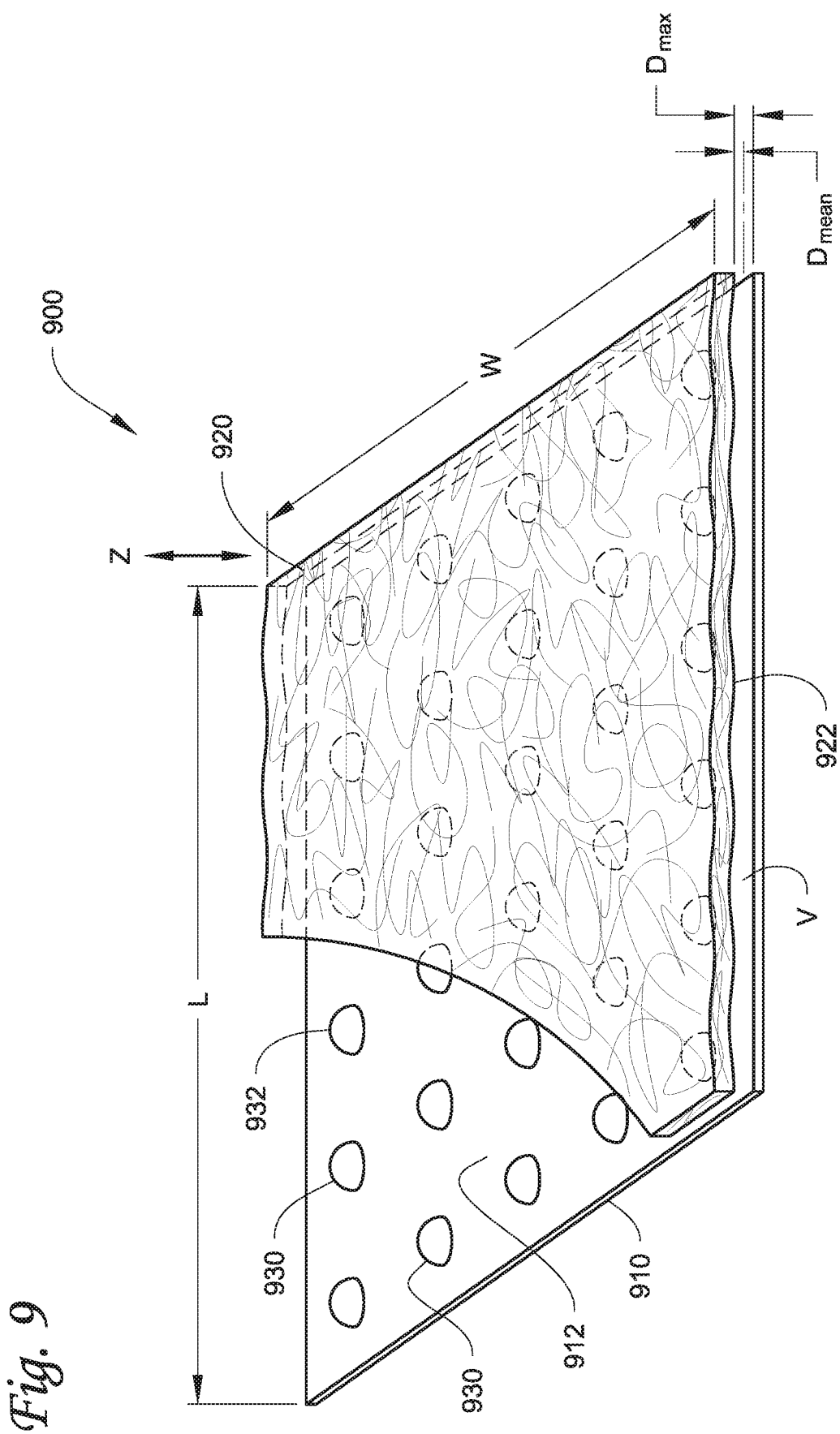
FIG. 9 is yet another example filter media consistent with the technology disclosed herein.

FIG. 9 depicts another example filter media 900 consistent with the technology disclosed herein. This example filter media 900 is generally consistent with the example filter media described above with reference to FIG. 8 and can have the same components, parameters, and properties as other examples described herein, except where explicitly contradictory. The filter media 900 has a downstream layer of filter material 910 abutting a spacing structure 930 on an upstream layer of fibers 920. The upstream layer of fibers 920 can have a support layer or not.

While the downstream layer of filter material 910 is non-corrugated, the currently-depicted example filter media 900 demonstrates another structure for achieving a particular mean void distance $D_{mean}$ between the upstream layer of fibers 920 and the downstream layer of filter material 910, such as a mean void distance $D_{mean}$ greater than 0.11 mm and less than 2.0 mm, 1.0 mm or 0.7 mm. In particular, the spacing structure 930 on the downstream layer of filter material 910 protrudes in the z-direction towards the upstream layer of fibers 920. In the current example, the spacing structure 930 has a series of discrete bulges that are spaced across the width W and the length L of the filter media 900. Similar to the example of FIG. 8, the spacing structure 930 can be defined by the downstream layer of filter material 910 itself or the spacing structure 930 can be a separate component that is deposited on the upstream side 912 of the downstream layer of filter material 910 or the downstream surface 922 of the upstream layer of fibers 920, which is described above.

Because the spacing between the layers of the filter media 900 is not uniform along the width W or length L directions, the mean void distance $D_{mean}$ is calculated based on measurements in both directions. In particular, the mean void distance $D_{mean}$ can be calculated by calculating the total volume V between the upstream layer of fibers 920 and the downstream layer of filter material 910 and dividing the total volume V by the area of the sample (which is the length L multiplied by the width W). The mean void distance $D_{mean}$ will generally be less than a maximum void distance $D_{max}$ between the layers, where the maximum void distance $D_{max}$ between the layers can be calculated based on the z-direction void distance between a peak 932 of the spacing structure and the upstream side 912 of the downstream layer of filter material 910. The maximum void distance $D_{max}$ can be calculated as an average at a plurality of sample locations across the filter media 900 in a manner similar to the mean corrugation depth as discussed above with reference to FIG. 1. In some embodiments the average maximum void distance $D_{max}$ is less than 4.0 mm. In some embodiments the average maximum void distance $D_{max}$ is less than 2.0 mm. In some embodiments the average maximum void distance $D_{max}$ is less than 1.5 mm.

Figure 10:
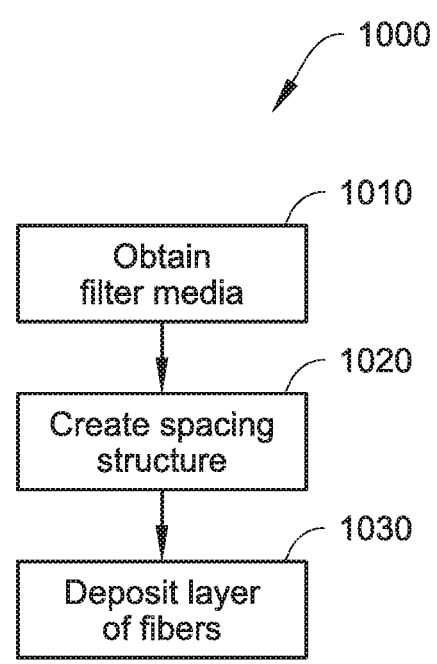
FIG. 10 is an example flow chart consistent with the technology disclosed herein.

FIG. 10 depicts a method 1000 consistent with embodiments of the technology disclosed herein. Filter material is generally obtained 1010, a spacing structure is created 1020, and a layer of fibers are deposited on the filter material 1030.

The filter material can be consistent with filter materials described herein. Generally, the filter material has a capture efficiency of at least 10% and, in some embodiments the filter material has a capture efficiency from 20% to 40%. The filter material generally incorporates fibers and can have a mean fiber diameter from 4 to 30 microns, in some embodiments. The filter material can contain cellulose fibers, synthetic fibers, and the like. In some embodiments the filter material is constructed by wet laying fibers, such as cellulose fibers, where a slurry formed with the fibers is dried to create the filter material.

The spacing structure is generally created 1020 relative to the filter material, and the spacing structure can be created 1020 through a variety of approaches. For example, the filter material can be corrugated. In such an example, a length of filter material is passed through corrugating equipment that creates the alternating peaks and valleys across the length of the filter material (such as depicted in FIGS. 1 and 2). The corrugations can be consisted with corrugations discussed throughout this document. In another example, a spacing structure is created 1020 by depositing a hot melt polymer on an upstream surface of the filter material. In yet another example, a spacing structure is created 1020 by coupling a pre-formed structure onto the filter material.

The layer of fibers is deposited 1030 on the spacing structure. Particularly, the layer of fibers is deposited 1030 on an upstream side of the filter material, and more particularly, across the spacing structure on the filter material. In embodiments where the filter material is corrugated, the layer of fibers is deposited 1030 to extend across the peaks of the corrugations of the filter material. The layer of fibers can be deposited 1030 on the spacing structure by pre-forming the layer of fibers, and then placing the pre-formed layer of fibers across the spacing structure. For example, the layer of fibers can be formed by a wet-laying process, and the wet-laid layer of fibers can be deposited 1030 across the spacing structure. In some alternate embodiments, as has been mentioned above, the spacing structure can be deposited on a downstream surface of the upstream layer of fibers. In such embodiments, the upstream layer of fibers having the spacing structure can be coupled to the downstream layer of filter material.

In some embodiments the fibers are constructed using a co-extrusion process to create a variety of configurations, such as bi-component fibers having a sheath/core structure or a side-by-side structure. In such embodiments the fibers can be cut as staple fibers and wet-laid onto a support layer to form the layer of fibers.

Alternatively, the act of depositing the fibers 1030 on the spacing structure can form the layer of fibers. In some embodiments, the layer of fibers is deposited 1030 by electrospinning the fibers onto the spacing structure. In some embodiments, the layer of fibers is deposited 1030 by melt-blowing polymeric fibers onto the spacing structure. In some embodiments, the layer of fibers is deposited 1030 by using spunbond technology to deposit polymeric fibers onto the spacing structure. In various embodiments, the layer of fibers self-adhere to the spacing structure of the filter material. The layer of fibers is deposited 1030 to define a generally planar configuration, although not necessarily perfectly planar, as discussed above.

In various embodiments, the layer of fibers is deposited 1030 directly onto the spacing structure of the filter material. In some other embodiments, the layer of fibers is deposited 1030 on a support layer and the support layer is coupled to the spacing structure of the filter material (to achieve a configuration similar to that depicted in FIG. 2). In some embodiments, the support layer is not coupled to the spacing structure of the filter material and is positioned to abut the spacing structure of the filter material. The support layer can be similar to that described above with reference to FIG. 2.

As discussed above, the fibers in the layer of fibers have a mean fiber diameter of at least 10 microns and in ranges described in more detail above. In some embodiments, a plurality of the fibers in the layer of fibers are crimped. Also, as discussed above, in some embodiments the layer of fibers is not self-supporting.

Figure 12:
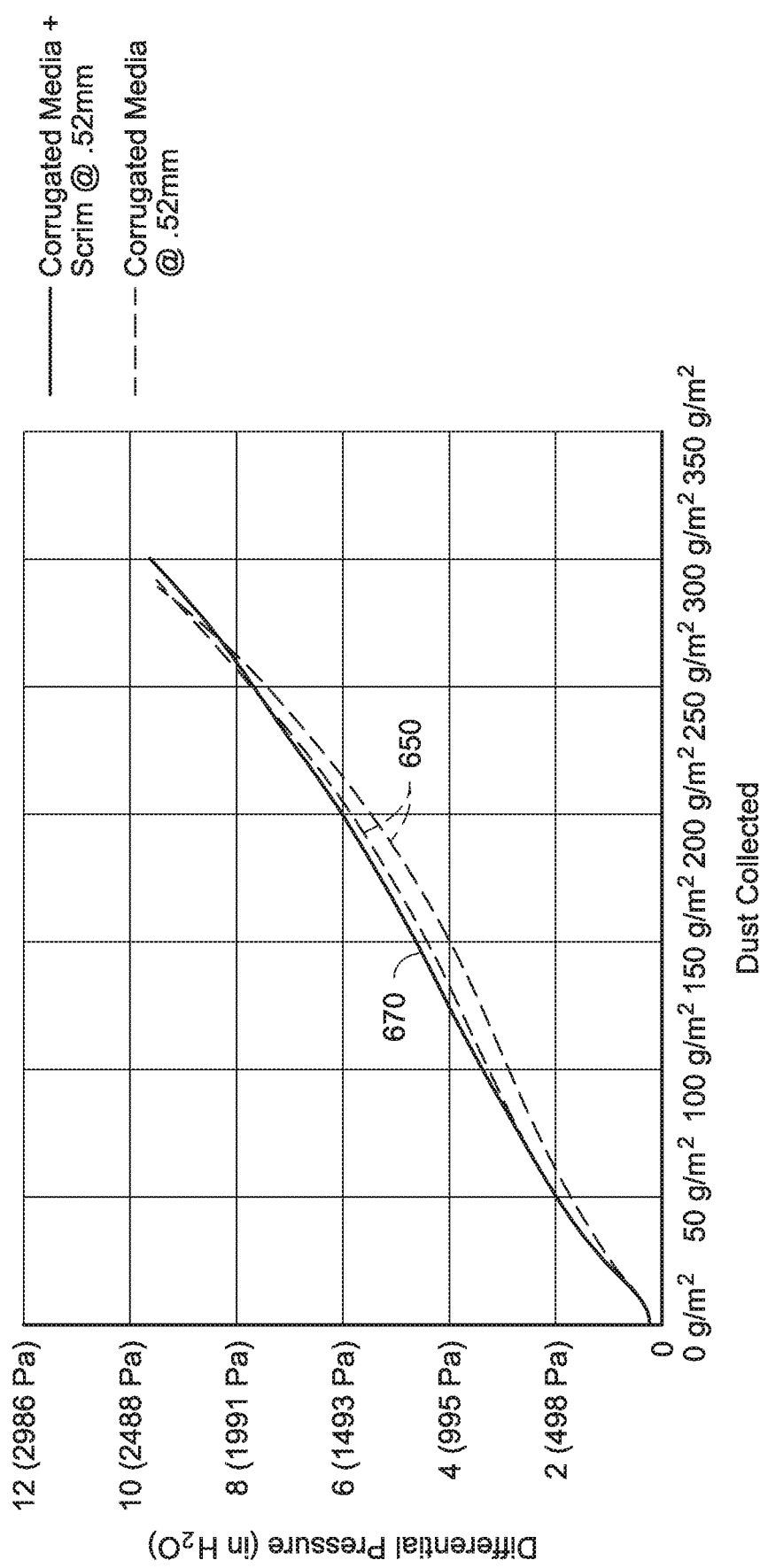
FIG. 12 is a graph showing a relationship between differential pressure and dust collected according to various filter medias.
Figure 13:
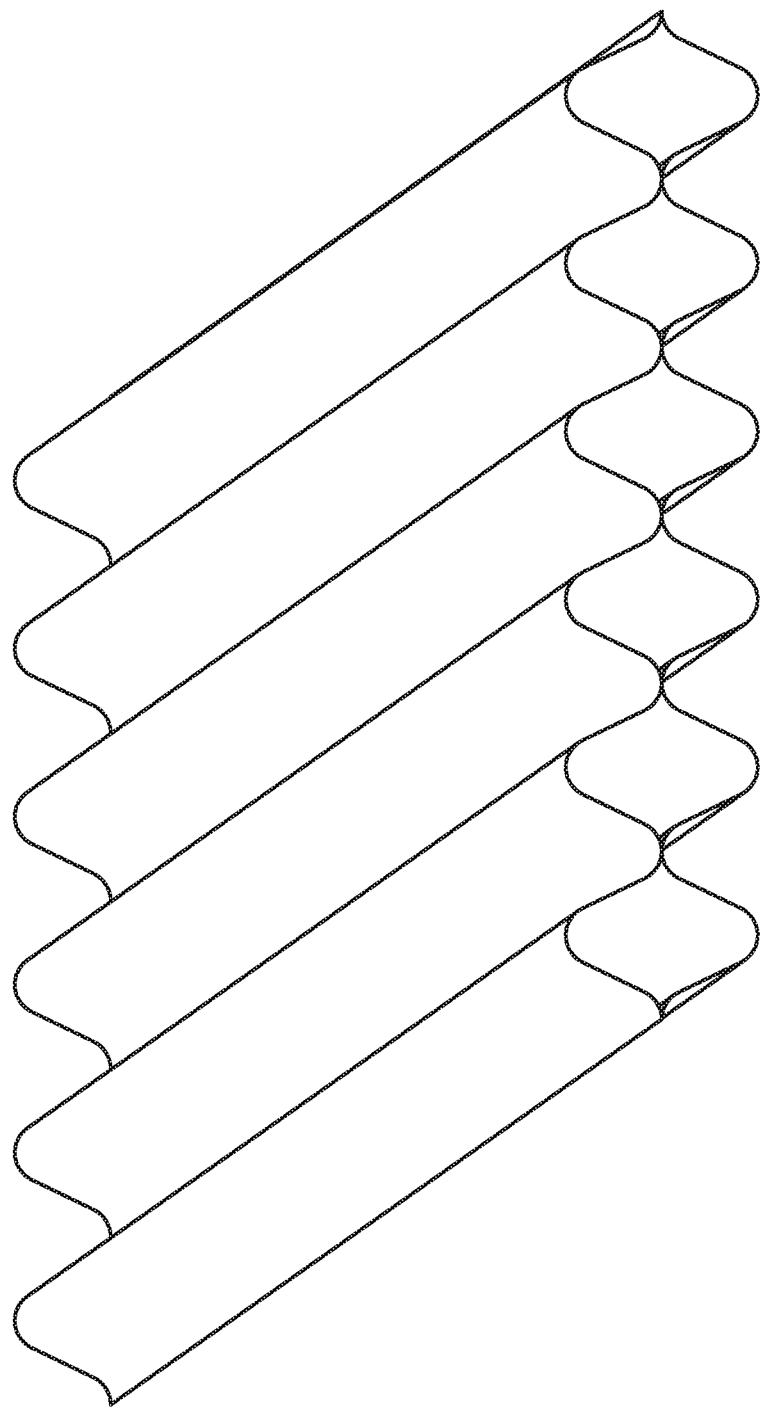
FIG. 13 depicts an example filter media structure.

FIG. 12 reflects test results comparing the differential pressure of the fifteenth comparative example 650 to a seventeenth comparative example 670, where the fifteenth comparative example 650 has a downstream sheet of cellulose media corrugated to a mean depth of 0.52 mm and an abutting, substantially planar, upstream layer of fibers that is a scrim layer constructed of PET/PP bicomponent fibers having a 30 g/m$^2$ basis weight, a 7% solidity, and contains fibers having a mean fiber diameter of 38 microns. The seventeenth comparative example 670 uses the same corrugated downstream sheet of cellulose media and the same upstream layer of fibers as the fifteenth comparative example, except the upstream layer of fibers is corrugated to also have a mean corrugation depth of 0.52 mm. The upstream layer of fibers is positioned on the downstream layer of cellulose media such that the peaks of the corrugations defined by the cellulose media abut the valleys of the corrugations defined by the upstream layer of fibers, similar to the structure depicted in FIG. 13. For testing, the corrugated upstream layer of fibers is clamped to the downstream sheet of cellulose media about their respective perimeters. Such a configuration increases the mean void distance between the upstream layer of fibers and the downstream layer of filter material.

The seventeenth comparative example 670 was tested and compared to two sets of data associated with the fifteenth comparative example 650. FIG. 12 suggests that there is not a notable difference in differential pressure across the two medias as dust is loaded on each media. In particular, there does not appear to be an advantage associated with corrugating the upstream layer of fibers.

Exemplary Embodiments

Embodiment 1. Filter media comprising:
  a downstream layer of filter material in a corrugated configuration defining peaks and valleys, wherein the downstream layer of filter material has a capture efficiency of at least 10% and a mean corrugation depth of less than 2.0 mm; and
  an upstream layer of fibers extending across the peaks of the downstream layer of filter material, the upstream layer of fibers having a mean fiber diameter of at least 10 microns, and the upstream layer of fibers has less than 10% solidity.

Embodiment 2. The filter media of any one of embodiments 1 and 3-13, wherein a plurality of fibers in the upstream layer of fibers are crimped.

Embodiment 3. The filter media of any one of embodiments 1-2 and 4-13, wherein the downstream layer of filter material has a capture efficiency from 20% to 40%.

Embodiment 4. The filter media of any one of embodiments 1-3 and 5-13, wherein the downstream layer of filter material comprises cellulose fibers.

Embodiment 5. The filter media of claim 4, wherein the cellulose fibers comprise wet-laid cellulose fibers.

Embodiment 6. The filter media of any one of embodiments 1-5 and 7-13, wherein the downstream layer of filter material comprises synthetic fibers.

Embodiment 7. The filter media of any one of embodiments 1-6 and 8-13, wherein the upstream layer of fibers comprises polymeric fibers.

Embodiment 8. The filter media of any one of embodiments 1-7 and 9-13, wherein the downstream layer of filter material comprises fibers having a mean fiber diameter from 4 to 30 microns.

Embodiment 9. The filter media of any one of embodiments 1-8 and 10-13, wherein the upstream layer of fibers is not self-supporting.

Embodiment 10. The filter media of any one of embodiments 1-9 and 11-13, wherein the upstream layer of fibers is an end layer and the upstream layer of fibers is in direct contact with the downstream layer of filter material.

Embodiment 11. The filter media of any one of embodiments 1-10 and 12-13, wherein the downstream layer of filter material defines corrugations having a mean corrugation depth of greater than 0.23 mm.

Embodiment 12. The filter media of any one of embodiments 1-11 and 13, wherein the upstream layer of fibers is non-corrugated.

Embodiment 13. The filter media of any one of embodiments 1-12, wherein the downstream layer of filter material is self-supporting.

Embodiment 14. A method of constructing a filter media, the method comprising: creating a spacing structure on a layer of filter material, wherein the filter material has a capture efficiency of at least 10%; and
depositing a layer of fibers across the spacing structure of the filter material, wherein the layer of fibers has a mean fiber diameter of at least 10 microns.

Embodiment 15. The method of any one of embodiments 14 and 16-24, wherein a plurality of fibers in the layer of fibers are crimped.

Embodiment 16. The method of any one of embodiments 14-15 and 17-24, wherein the layer of filter material has a capture efficiency from 20% to 40%.

Embodiment 17. The method of any one of embodiments 14-16 and 18-24, wherein the layer of filter material comprises wet-laid cellulose fibers.

Embodiment 18. The method of any one of embodiments 14-17 and 19-24, wherein the layer of filter material comprises synthetic fibers.

Embodiment 19. The method of any one of embodiments 14-18 and 20-24, wherein the layer of fibers is not self-supporting.

Embodiment 20. The method of any one of embodiments 14-19 and 21-24 wherein the layer of filter material comprises fibers having a mean fiber diameter from 4 to 30 microns.

Embodiment 21. The method of any one of embodiments 14-20 and 22-24, wherein forming the spacing structure comprises forming corrugations in the layer of filter material.

Embodiment 22. The method of any one of embodiments 14-21 and 23-24, wherein the layer of filter material is corrugated to have a mean corrugation depth of greater than 0.23 mm.

Embodiment 23. The method of any one of embodiments 14-22 and 24, wherein the layer of filter material is corrugated to have a mean corrugation depth of greater than 0.23 mm.

Embodiment 24. The method of any one of embodiments 14-23, wherein forming the spacing structure comprises depositing a spacing structure on an upstream surface of the layer of filter material.

Embodiment 25. Filter media comprising:
a downstream layer of filter material, wherein the downstream layer of filter material has a capture efficiency of at least 10%; and
an upstream layer of fibers, wherein the upstream layer of fibers has a mean fiber diameter of at least 10 microns and a solidity of less than 10%; and
a spacing structure defining a mean void distance between the upstream layer of fibers and the downstream layer of filter material greater than 0.11 mm.

Embodiment 26. The filter media of any one of embodiments 25 and 27-34, wherein the downstream layer of filter material has a spacing structure protruding in a direction perpendicular to a length and a width of the filter media.

Embodiment 27. The filter media of any one of embodiments 25-26 and 28-34, wherein the spacing structure are corrugations defined by the downstream layer of filter material.

Embodiment 28. The filter media of any one of embodiments 25-27 and 29-34, wherein the spacing structure are embossments defined by the downstream layer of filter material.

Embodiment 29. The filter media of any one of embodiments 25-28 and 30-34, wherein the spacing structure are deposits disposed between the upstream layer of fibers and the downstream layer of filter material.

Embodiment 30. The filter media of any one of embodiments 25-29 and 31-34, wherein the upstream layer of fibers is not self-supporting.

Embodiment 31. The filter media of any one of embodiments 25-30 and 32-34, wherein the upstream layer of fibers is non-corrugated.

Embodiment 32. The filter media of any one of embodiments 25-31 and 33-34, wherein the downstream layer of filter material is non-corrugated.

Embodiment 33. The filter media of any one of embodiments 25-32 and 34, wherein the downstream layer of filter material is self-supporting.

Embodiment 34. The filter media of any one of embodiments 25-33, wherein the mean void distance between the upstream layer of fibers and the downstream layer of filter material is less than 1.0 mm.

It should also be noted that, as used in this specification and the appended claims, the phrase "configured" describes a system, apparatus, or other structure that is constructed or configured to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. Filter media comprising:
    a downstream layer of filter material in a corrugated configuration defining peaks and valleys, wherein the downstream layer of filter material has a capture efficiency of at least 10% and a mean corrugation depth of less than 2.0 mm; and
    an upstream layer of fibers extending across the peaks of the downstream layer of filter material, the upstream layer of fibers having a mean fiber diameter of at least 10 microns, and the upstream layer of fibers has less than 10% solidity.

2. The filter media of claim 1, wherein the downstream layer of filter material comprises cellulose fibers.

3. The filter media of claim 1, wherein the downstream layer of filter material comprises fibers having a mean fiber diameter from 4 to 30 microns.

4. The filter media of claim 1, wherein the upstream layer of fibers is not self-supporting.

5. The filter media of claim 1, wherein the upstream layer of fibers is an end layer and the upstream layer of fibers is in direct contact with the downstream layer of filter material.

6. The filter media of claim 1, wherein the downstream layer of filter material defines corrugations having a mean corrugation depth of greater than 0.23 mm.

7. The filter media of claim 1, wherein the upstream layer of fibers is non-corrugated.

8. The filter media of claim 1, wherein the downstream layer of filter material is self-supporting.

9. A method of constructing a filter media, the method comprising: creating a spacing structure on a layer of filter material, wherein the filter material has a capture efficiency of at least 10%; and depositing a layer of fibers across the spacing structure of the filter material, wherein the layer of fibers has a mean fiber diameter of at least 10 microns and a solidity of less than 10%, and wherein the spacing structure defines a void space between the layer of fibers and the layer of filter material.

10. The method of claim 9, wherein the layer of filter material comprises fibers having a mean fiber diameter from 4 to 30 microns.

11. The method of claim 9, wherein creating the spacing structure comprises forming corrugations in the layer of filter material.

12. The method of claim 9, wherein the layer of filter material is corrugated to have a mean corrugation depth of greater than 0.23 mm.

13. The method of claim 9, wherein creating the spacing structure comprises depositing a spacing structure on an upstream surface of the layer of filter material.

14. Filter media comprising:
a downstream layer of filter material, wherein the downstream layer of filter material has a capture efficiency of at least 10%; and
an upstream layer of fibers, wherein the upstream layer of fibers has a mean fiber diameter of at least 10 microns and a solidity of less than 10%; and
a spacing structure defining a mean void distance between the upstream layer of fibers and the downstream layer of filter material greater than 0.11 mm.

15. The filter media of claim 14, wherein the downstream layer of filter material has the spacing structure protruding in a direction perpendicular to a length and a width of the filter media.

16. The filter media of claim 14, wherein the spacing structure comprises corrugations defined by the downstream layer of filter material.

17. The filter media of claim 14, wherein the spacing structure comprises embossments defined by the downstream layer of filter material.

18. The filter media of claim 14, wherein the spacing structure comprises deposits disposed between the upstream layer of fibers and the downstream layer of filter material.

19. The filter media of claim 14, wherein the upstream layer of fibers is not self-supporting.

20. The filter media of claim 14, wherein the mean void distance between the upstream layer of fibers and the downstream layer of filter material is less than 1.0 mm.

* * * * *